(12) United States Patent
Nakata et al.

(10) Patent No.: US 8,543,314 B2
(45) Date of Patent: Sep. 24, 2013

(54) INJECTION CONTROL DEVICE OF INTERNAL COMBUSTION ENGINE

(75) Inventors: Kenichiro Nakata, Anjo (JP); Koji Ishizuka, Chita (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/434,139

(22) Filed: Mar. 29, 2012

(65) Prior Publication Data

US 2012/0185155 A1    Jul. 19, 2012

Related U.S. Application Data

(63) Continuation of application No. 12/201,426, filed on Aug. 29, 2008, now abandoned.

(30) Foreign Application Priority Data

Aug. 31, 2007    (JP) .................................. 2007-227115

(51) Int. Cl.
*G06F 17/00*    (2006.01)
(52) U.S. Cl.
USPC ............................ 701/103; 123/456; 123/457
(58) Field of Classification Search
USPC .................... 123/456, 457; 701/103
See application file for complete search history.

(56) References Cited

U.S. PATENT DOCUMENTS

| 4,603,671 A * | 8/1986 | Yoshinaga et al. ............ 123/467 |
| 5,402,760 A | 4/1995 | Takeuchi et al. |
| 5,445,019 A | 8/1995 | Glidewell et al. |
| 5,535,621 A | 7/1996 | Glidewell et al. |
| 5,975,056 A | 11/1999 | Augustin et al. |
| 6,088,647 A | 7/2000 | Hemberger et al. |
| 6,102,009 A | 8/2000 | Nishiyama |
| 6,142,121 A * | 11/2000 | Nishimura et al. ............ 123/456 |
| 6,236,931 B1 * | 5/2001 | Poggio et al. ................. 701/104 |
| 6,463,910 B2 * | 10/2002 | Nishiyama ..................... 123/456 |

(Continued)

FOREIGN PATENT DOCUMENTS

| JP | 2000-265892 | 9/2000 |
| JP | 2003-314338 | 11/2003 |
| JP | 2006-233858 | 9/2006 |

OTHER PUBLICATIONS

Office Action (6 pgs.) dated Jul. 16, 2012 issued in corresponding German Application No. 10 2008 041 659.2 with an at least partial English-language translation thereof (4 pgs.).

(Continued)

*Primary Examiner* — Stephen K Cronin
*Assistant Examiner* — David Hamaoui
(74) *Attorney, Agent, or Firm* — Nixon & Vanderhye PC

(57) ABSTRACT

A fuel injection control device (ECU) for controlling injection supply of fuel to an engine is applied to an injector that has a valve body formed with a fuel injection hole, a needle accommodated in the valve body for opening and closing the injection hole, and a piezoelectric element for driving the needle such that the needle reciprocates and that can continuously adjust an injection rate in accordance with an injection command signal to the piezoelectric element. The fuel injection control device senses a fuel pressure waveform indicating a transition of fuel pressure fluctuation accompanying a predetermined injection of the injector based on an output of a fuel pressure sensor and calculates an injection command signal for approximating a predetermined injection parameter concerning the predetermined injection to a reference value of the parameter based on the sensed fuel pressure waveform.

14 Claims, 18 Drawing Sheets

(56) References Cited

U.S. PATENT DOCUMENTS

| | | | |
|---|---|---|---|
| 6,516,773 | B2 | 2/2003 | Dutart et al. |
| 6,679,222 | B1 * | 1/2004 | Reischl et al. ............... 123/305 |
| 6,729,297 | B2 * | 5/2004 | Futonagane et al. .......... 123/299 |
| 7,000,600 | B1 | 2/2006 | Yamada et al. |
| 7,188,608 | B2 | 3/2007 | Wilson et al. |
| 7,195,002 | B2 | 3/2007 | Tsutsui |
| 7,201,148 | B2 | 4/2007 | Nakane |
| 7,210,458 | B2 | 5/2007 | Walther et al. |
| 7,267,097 | B2 | 9/2007 | Tsuitsui et al. |
| 7,472,689 | B2 | 1/2009 | Ishizuka et al. |
| 7,677,092 | B2 | 3/2010 | Ishizuka et al. |
| 7,747,377 | B2 | 6/2010 | Nakata et al. |
| 7,765,995 | B2 | 8/2010 | Nakata et al. |
| 7,792,632 | B2 | 9/2010 | Ishizuka et al. |
| 7,861,691 | B2 | 1/2011 | Nakata et al. |
| 7,865,293 | B2 | 1/2011 | Ishizuka et al. |
| 7,873,460 | B2 | 1/2011 | Nakata et al. |
| 7,921,707 | B2 | 4/2011 | Ishizuka et al. |
| 7,933,712 | B2 | 4/2011 | Ishizuka et al. |
| 8,014,932 | B2 | 9/2011 | Nakata et al. |
| 8,100,112 | B2 | 1/2012 | Nakata et al. |
| 2003/0233998 | A1 | 12/2003 | Futonagane et al. |
| 2008/0228374 | A1 | 9/2008 | Ishizuka et al. |
| 2011/0000465 | A1 | 1/2011 | Stoecklein et al. |

OTHER PUBLICATIONS

Borgmann, K. et al., "Benzin-Direkt-einspritzsystem" mit Piezo-Injektor fur strahlgefuhrte Brennverfahren, Internationales Wiener Motoren-symposium, May 2003, (12 pgs.).
Office Action (4 pgs.) dated Jan. 18, 2012 issued in corresponding Chinese Application No. 200810214286.8 with an at least partial English-language translation thereof (3 pgs.).
Office Action (4 pgs.) dated Mar. 2, 2011 issued in corresponding Chinese Application No. 200810214286.8 with an at least partial English-language translation thereof (3 pgs.).
Japanese Office Action dated Feb. 23, 2010, issued in corresponding Japanese Application No. 2007-227115, with English translation.
Japanese Office Action dated Jun. 26, 2009, issued in corresponding Japanese Application No. 2007-227115, with English translation.
U.S. Appl. No. 12/210,409, Koji Ishizuka et al., filed Sep. 15, 2008.
U.S. Appl. No. 12/210,440 (now USP 7,873,460), Kenichiro Nakata et al., filed Sep. 15, 2008.
U.S. Appl. No. 12/233,800 (now USP 7,861,691), Kenichiro Nakata et al., filed Sep. 19, 2008.
U.S. Appl. No. 12/235,917 (now USP 8,100,112), Kenichiro Nakata et al., filed Sep. 23, 2008.
U.S. Appl. No. 12/236,882 (now USP 7,933,712), Koji Ishizuka et al., filed Sep. 24, 2008.
U.S. Appl. No. 12/255,936, Koji Ishizuka et al., filed Oct. 22, 2008.
U.S. Appl. No. 12/256,100 (now USP 7,792,632), Koji Ishizuka et al., filed Oct. 22, 2008.
U.S. Appl. No. 12/258,726 (now USP 7,921,707), Koji Ishizuka et al., filed Oct. 27, 2008.
U.S. Appl. No. 12/258,750 (now USP 7,677,092), Koji Ishizuka et al., filed Oct. 27, 2008.
U.S. Appl. No. 11/930,668 of Ishizuka, filed Oct. 31, 2007.
U.S. Appl. No. 12/179,235 (now USP 7,865,293) of Ishizuka, filed Jul. 24, 2008.
U.S. Appl. No. 12/186,038 of Nakata, filed Aug. 5, 2008.
U.S. Appl. No. 12/187,638 of Nakata, filed Aug. 7, 2008.
U.S. Appl. No. 12/189,376 (now USP 7,765,995) of Nakata, filed Aug. 11, 2008.
U.S. Appl. No. 12/194,917 of Nakata filed Aug. 20, 2008.
U.S. Appl. No. 12/195,609 (now USP 8,014,932) of Nakata filed Aug. 21, 2008.
U.S. Appl. No. 12/194,130 (now USP 7,747 377) of Nakata filed Aug. 19, 2008.
U.S. Appl. No. 12/197,447 of Nakata filed Aug. 25, 2008.

\* cited by examiner

| | P (BASE PRESSURE) | |
|---|---|---|
| | (LOW) ⟶ | (HIGH) |
| Tc | (LONG) ⟶ | (SHORT) |

| | INJECTION PERIOD (TQ) | |
|---|---|---|
| | (SHORT) ⟶ | (LONG) |
| Tc | (SHORT) ⟶ | (LONG) |

INJECTION CONTROL DEVICE OF INTERNAL COMBUSTION ENGINE

CROSS REFERENCE TO RELATED APPLICATIONS

This is a continuation of U.S. application Ser. No. 12/201,426, filed Aug. 29, 2008, which claims priority to Japanese Application No. 2007-227115, filed on Aug. 31, 2007, the disclosures of which is incorporated herewith in its entirety.

BACKGROUND OF THE INVENTION

1. Field of the Invention

The present invention relates to a fuel injection control device that is applied to a fuel supply system injecting fuel through a predetermined injector and that controls a fuel injection characteristic of the system.

2. Description of Related Art

As one of technologies for improving emission of an in-vehicle diesel engine or the like, there is a known technology (high-pressure injection) for injecting fuel, which is pressurized to high pressure, directly into a cylinder through an injector. In recent years, a common rail fuel injection system (for example, a system described in Patent document 1: JP-A-H10-220272) has come to attract attention as a fuel injection system realizing the high-pressure injection. In the system, the fuel pumped from a fuel pump is accumulated in a common rail at a high-pressure state, and the accumulated high-pressure fuel is supplied to the injectors of respective cylinders through pipes (high-pressure fuel passages) provided to the respective cylinders. In the system, a predetermined pressure sensor (a rail pressure sensor) is provided to the common rail. The system is configured to control drive of various devices constituting a fuel supply system based on an output (a sensor output) of the rail pressure sensor.

Conventionally, in the case where an injection operation of the injector is controlled with such the common rail fuel injection system, a control method of setting an injection pattern in accordance with an engine operation state of each time with reference to a map (an adaptation map), in which an injection pattern (i.e., an adaptation value) for each engine operation state is written, or a mathematical expression is widely adopted. The device stores the optimum pattern (i.e., the adaptation value), which is beforehand obtained for each anticipated engine operation state through experiment and the like, as the map, the mathematical expression or the like (in ROM, for example). Thus, the device sets the injection pattern corresponding to the engine operation state with reference to the map, the mathematical expression or the like.

However, when mass production and mass marketing of respective components of the engine control system are performed, usually, there occur certain individual differences in characteristics of various kinds of control components including the injector, for example, between the engines and also between the cylinders in the case of a multi-cylinder engine. In such the case, it takes a lot of works and is not realistic for the present production system to obtain the adaptation values (the optimum injection patterns) for all the components (for example, all the cylinders manufactured through the mass production and mounted in the vehicle) in consideration of also the individual differences. Therefore, it is difficult to perform the control in consideration of all the influences due to the individual differences even when the map, in which the adaptation values are written, or the mathematical expression is used.

In order to perform the injection control with high accuracy, a characteristic change resulting from aging of the control components and the like is not negligible. Even if the conventional device such as the device described in Patent document 1 can obtain the optimum value with high accuracy in an initial stage, an influence of the subsequent characteristic change is unknowable. Therefore, there is a concern that there occurs a deviation from the optimum value with passage of time. In this case, an adaptation value of a degradation factor (a coefficient concerning a degree of degradation with time) may be beforehand obtained with an experimental value and the like and may be stored as a map, a mathematical expression or the like. However, there is also the above-mentioned individual difference in the temporal characteristic change of every component. Therefore, it is difficult to thoroughly remove the influence.

SUMMARY OF THE INVENTION

It is an object of the present invention to provide a fuel injection control device capable of performing appropriate fuel injection control in accordance with an injection characteristic of each time including a characteristic change with time.

According to an aspect of the present invention, a fuel injection control device for controlling a fuel injection characteristic at the time when performing injection supply of fuel to a target engine is applied to an injector that has a valve body formed with a fuel injection hole, a valve member accommodated in the valve body for opening and closing the injection hole, and an actuator driving the valve member such that the valve member reciprocates and that is structured to be able to continuously adjust an injection rate of the injector indicating a fuel injection quantity per unit time in accordance with an actuator operation signal to the actuator. The fuel injection control device has a fuel pressure sensing section and an operation signal calculating section. The fuel pressure sensing section senses a fuel pressure waveform indicating a transition of a fuel pressure fluctuation accompanying a predetermined injection of the injector. The operation signal calculating section calculates the actuator operation signal for approximating a predetermined injection parameter concerning the predetermined injection to a reference value of the parameter based on the fuel pressure waveform sensed by the fuel pressure sensing section.

The inventors noted that a transition of a fuel pressure fluctuation (i.e., a fuel pressure waveform) accompanying a predetermined injection indicates an important characteristic of the injection and invented the above device that senses the fuel pressure waveform and that variably sets the injection command (the injection command signal) to the injector, or more specifically, the actuator operation signal of the valve member of the injector, based on the sensed fuel pressure waveform. With such the device, the characteristic of the target injection can be controlled in a desired mode easily and appropriately based on the fuel pressure waveform. In particular, the device employs the reciprocating drive injector capable of continuously adjusting the fuel injection quantity per unit time (i.e., the injection rate) among the many kinds of the injectors. With such the injector, the injection characteristic of the injector can be precisely controlled based on the injection command to the injector. Moreover, such the injector has been already put in practical use in part, and the practicality thereof has been acknowledged. Therefore, the device according to above aspect of the present invention can perform the appropriate fuel injection control in accordance with the injection characteristic of each time with high practicality.

According to another aspect of the present invention, the operation signal calculating section calculates the actuator operation signal concerning the predetermined injection during execution of the predetermined injection. The fuel injection control device further has an operation signal setting section for setting the actuator operation signal calculated by the operation signal calculating section as a command concerning the predetermined injection during the execution of the predetermined injection.

The device according to the above aspect can sense the injection characteristic (equivalent to the pressure transition) concerning the predetermined injection with high simultaneity (i.e., in real time). Eventually, by adjusting a subsequent injection operation based on the previously sensed pressure transition, an error at a preceding timing can be compensated, for example.

According to another aspect of the present invention, the operation signal calculating section calculates an injection start timing of the predetermined injection based on the fuel pressure waveform and calculates the actuator operation signal subsequent to the injection start timing of the same injection based on a deviation of the injection start timing from a reference timing thereof to approximate a total injection quantity of one injection as the injection parameter to a reference value of the parameter.

According to another aspect of the present invention, the operation signal calculating section calculates an integration value of the injection rate from an injection start to a predetermined timing of the predetermined injection or a correlation value of the integration value based on the fuel pressure waveform and calculates the actuator operation signal subsequent to the predetermined timing of the same injection based on a deviation of the integration value or the correlation value from a reference value thereof to approximate a total injection quantity of one injection as the injection parameter to a reference value of the parameter.

According to another aspect of the present invention, the operation signal calculating section calculates an injection rate at a predetermined timing of the predetermined injection based on the fuel pressure waveform and calculates the actuator operation signal subsequent to the predetermined timing of the same injection based on a deviation of the injection rate from a reference value thereof to approximate a total injection quantity of one injection as the injection parameter to a reference value of the parameter.

With each of the above three constructions, by adjusting the injection operation after the predetermined timing, the error in the injection rate or the injection rate integration value at the predetermined timing or the error in the timing (the injection start timing) can be compensated. As a result, the total injection quantity of one injection can be suitably controlled to a desired value (a reference value).

As for the device according to the immediately preceding aspect of the present invention, a following construction is effective. That is, according to another aspect of the present invention, the injection rate at the predetermined timing is the maximum injection rate in the predetermined injection.

Among the injection rates, specifically the maximum injection rate is known as a parameter well indicating the feature of the injection characteristic. Therefore, also in the case of adjusting the total injection quantity of one injection, as in the above construction, it is specifically effective to calculate the actuator operation signal subsequent to the predetermined timing based on the deviation of the maximum injection rate.

In the case of adjusting the total injection quantity of one injection, an injection end timing is specifically important. Therefore, according to another aspect of the present invention, the operation signal calculating section calculates a signal for deciding an injection end timing of the predetermined injection as the actuator operation signal. With such the construction, the total injection quantity of the predetermined injection can be adjusted appropriately.

According to another aspect of the present invention, the fuel injection control device further has an operation signal setting section for setting the actuator operation signal calculated by the operation signal calculating section as a command concerning a certain injection of the same kind as the predetermined injection, which is executed on the occasion of the calculation of the actuator operation signal, if the certain injection is executed after an end of the predetermined injection.

With such the construction, by applying the injection data (the actuator operation signal) obtained about the predetermined injection to the same kind of injection performed after the predetermined injection, the injection characteristic can be improved appropriately. By continuously producing the injection command while applying such the feedback to the injection command, appropriate fuel injection can be performed over a long period of time.

As for the device according to the immediately preceding aspect of the present invention, each of following four constructions or an arbitrary combination of the constructions is effective.

That is, according to another aspect of the present invention, the operation signal calculating section calculates a rising angle or a falling angle of an injection rate waveform indicating a transition of the injection rate in the predetermined injection based on the fuel pressure waveform. The operation signal calculating section calculates the actuator operation signal for approximating the rising angle or the falling angle of the injection rate waveform of the injection as the injection parameter to a reference value of the parameter based on a deviation of the rising angle or the falling angle from a reference angle thereof.

According to another aspect of the present invention, the operation signal calculating section calculates a position of an apex of an injection rate waveform indicating a transition of the injection rate in the predetermined injection (i.e., an end point of a side of a polygon) based on the fuel pressure waveform. The operation signal calculating section calculates the actuator operation signal for approximating the position of the apex of the injection rate waveform of the injection as the injection parameter to a reference value of the parameter based on a deviation of the position of the apex from a reference point thereof.

According to another aspect of the present invention, the operation signal calculating section calculates the maximum injection rate of an injection rate waveform indicating a transition of the injection rate in the predetermined injection based on the fuel pressure waveform. The operation signal calculating section calculates the actuator operation signal for approximating the maximum injection rate of the injection rate waveform of the injection as the injection parameter to a reference value of the parameter based on a deviation of the maximum injection rate from a reference value thereof.

According to another aspect of the present invention, the operation signal calculating section calculates an injection rate in a stable interval, in which the injection rate is maintained at a constant value, in an injection rate waveform indicating a transition of the injection rate in the predetermined injection based on the fuel pressure waveform. The operation signal calculating section calculates the actuator operation signal for approximating the injection rate in the stable interval of the injection rate waveform of the injection as the injection parameter to a reference value of the parameter based on a deviation of the injection rate from a reference value thereof.

With each of the construction of the above four aspects of the invention or an arbitrary combination of the constructions, the predetermined parameter related to the injection characteristic (the rising or falling angle, the position of the apex, the maximum injection rate or the injection rate in the stable interval) can be controlled to a desired value (a reference value). As a result, suitable fuel injection control can be performed in accordance with the injection characteristic of each time.

According to another aspect of the present invention, the injection rate waveform takes the form of one of a triangle, a trapezoid and a rectangle or the form of a diagram as a combination of multiplicity of at least one kind of the triangle, the trapezoid and the rectangle.

In the case where a general injector is adopted, normally, the diagram as the profile of the injection rate transition of the injector belongs to either one of the above-described diagrams. Therefore, when the general injector is adopted, adoption of the above construction is effective.

According to another aspect of the present invention, the fuel injection control device is applied to a pressure accumulator type fuel injection system having a pressure accumulator for accumulating high-pressure fuel to be supplied to the injector and at least one fuel pressure sensor for sensing pressure of the fuel flowing through an inside of a fuel passage extending from a fuel discharge hole of the pressure accumulator to an injection hole of the injector at a predetermined point downstream of a neighborhood of the fuel discharge hole of the pressure accumulator with respect to a fuel flow direction. The fuel pressure sensing section senses the fuel pressure waveform by sequentially sensing the fuel pressure based on an output of the fuel pressure sensor.

In this way, the above-described fuel pressure sensor is installed to measure the pressure at the predetermined point downstream of the neighborhood of the fuel discharge hole of the pressure accumulator in the fuel passage extending from the pressure accumulator to the injection hole of the injector. Thus, the pressure fluctuation mode due to at least one of an injection operation and an actual injection of the injector concerning the predetermined injection can be accurately sensed at the installation point of the sensor. For example, the injection operation is opening/closing action of an electromagnetic valve in the case of an injector of a type that drives a needle based on the opening/closing of the electromagnetic valve. The actual injection is an injection actually performed through the injection operation.

Fundamentally, the device of Patent document 1 described above controls the fuel pressure of the injector only with the rail pressure sensor that senses the pressure (i.e., the rail pressure) in the common rail (the pressure accumulator). In this device, the pressure fluctuation due to the injection (including the injection operation) attenuates when or before the fluctuation reaches the common rail from the injection hole of the injector and does not appear as a fluctuation of the rail pressure. Therefore, with such the device, it is difficult to sense the pressure fluctuation caused by the above-described injection with high accuracy.

As contrasted thereto, the device according to the above aspect of the present invention has the fuel pressure sensor that senses the injection pressure at the position closer to the fuel injection hole than the rail pressure sensor (or a sensor provided near the common rail) is. Therefore, the pressure fluctuation due to the injection (including the injection operation) can be grasped appropriately with the pressure sensor before the pressure fluctuation attenuates. Accordingly, with such the device, the actuator operation signal can be adjusted appropriately based on the fuel pressure sequentially sensed with the fuel pressure sensing section, and the appropriate fuel injection control can be performed.

In some cases, the fuel injection control device constituting the fuel injection system as described in Patent document 1 is provided with a fuel pulsation reducing section in a connection between the common rail and a fuel discharge pipe of the common rail for reducing a fuel pulsation transmitted to the common rail through the fuel discharge pipe in order to reduce the pressure pulsation in the common rail and to supply the fuel to the injector at stable pressure. In such the cases, the pressure fluctuation due to the injection (including the injection operation) arises in the injection hole of the injector and spreads toward the common rail through the common rail fuel discharge pipe. The fuel pulsation out of the pressure fluctuation is reduced (attenuated) by the fuel pulsation reducing section. Therefore, with such the construction, it is difficult to correctly sense the pressure fluctuation mode due to the injection (including the injection operation) based on the pressure in the common rail (i.e., the rail pressure).

As contrasted thereto, according to another aspect of the present invention, the fuel injection control device is applied to a fuel injection system having a pressure accumulator for accumulating high-pressure fuel to be supplied to the injector, a fuel pulsation reducing section provided in a connection between the pressure accumulator and a fuel discharge pipe of the pressure accumulator for reducing a fuel pulsation transmitted to the pressure accumulator through the fuel discharge pipe, and at least one fuel pressure sensor for sensing pressure of the fuel flowing through an inside of a fuel passage extending from the pressure accumulator to the injection hole of the injector at a predetermined point downstream of the fuel pulsation reducing section with respect to a fuel flow direction. The fuel pressure sensing section senses the fuel pressure waveform by sequentially sensing the fuel pressure based on an output of the fuel pressure sensor. With such the construction, the pressure fluctuation mode can be sensed with the fuel pressure sensor before the fuel pulsation is reduced by the fuel pulsation reducing section. Eventually, the pressure fluctuation mode can be sensed with high accuracy.

According to another aspect of the present invention, the fuel pulsation reducing section is constituted by an orifice (a restrictor), a flow damper, or a combination of the orifice and the flow damper. With such the construction, the above object can be attained appropriately. Moreover, since the technology for reducing the fuel pulsation with the use of the orifice or the flow damper has been already put in practical use and has actual achievements, thereby possessing high practicality and reliability.

According to another aspect of the present invention, the fuel pressure sensor is provided inside or near the injector.

The pressure fluctuation mode due to the injection (including the injection operation) can be sensed through the sensor output of the fuel pressure sensor with higher accuracy as the installation position of the fuel pressure sensor is closer to the fuel injection hole of the injector. Therefore, in order to sense the pressure fluctuation mode with high accuracy, it is effective to install the fuel pressure sensor inside or near the injector as in the construction according to the above aspect. In this case, if the fuel pressure sensor is provided to a fuel inlet of the injector, mountability and maintenance performance of the fuel pressure sensor are improved and the pressure can be sensed accurately and comparatively stably.

According to another aspect of the present invention, the fuel pressure sensor is provided in a fuel discharge pipe of the pressure accumulator at a position closer to the fuel injection hole of the injector than the pressure accumulator. In the device using the fuel pressure sensor according to the above aspects of the present invention, it is important to locate the sensor at a position, which is provided closer to the injector than the pressure accumulator to the extent that the pressure fluctuation caused in the injector does not attenuate completely before reaching the position. For this reason, it is desirable to locate the fuel pressure sensor at the position close to the injector.

According to yet another aspect of the present invention, the actuator is a piezoelectric element that continuously changes an extension-contraction amount thereof in accordance with a continuous change of applied voltage as the actuator operation signal.

The injector of the type that uses the piezoelectric element as the actuator and that can continuously adjust the injection rate is well known. By applying the device according to the above aspects to the injector of such the kind, the practicality of the device is improved. Moreover, with such the injector, the injection rate can be controlled continuously and a boot-shaped injection can be realized, for example. The boot-shaped injection increases the injection rate stepwise in one injection.

The function of each of multiple sections according to the present invention may be realized by a hardware resource having a function specified by a construction thereof, a hardware resource having a function specified by a program, or a combination of the hardware resources of both types. The functions of the sections are not limited to those realized by hardware resources physically independent from each other.

The present invention can be specified not only as an invention related to an apparatus but also as an invention related to a program, an invention related to a storage medium storing the program, and an invention related to a method.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereafter, embodiments of the present invention will be described with reference to the drawings.

A fuel injection device according to a first embodiment of the present invention is mounted, for example, in a common rail fuel injection system (a high-pressure injection fuel supply system) for controlling a reciprocating diesel engine as an engine for an automobile. That is, like the device described in Patent document 1, the device according to the present embodiment is also a fuel injection device for a diesel engine used to perform injection supply (direct injection supply) of high-pressure fuel (for example, light oil at injection pressure of 1000 atmospheres or higher) directly into a combustion chamber in an engine cylinder of the diesel engine (an internal combustion engine).

First, an outline of the common rail fuel injection system according to the present embodiment will be explained with reference to FIG. 1. It is assumed that the engine according to the present embodiment is a multi-cylinder engine (for example, an in-line four-cylinder engine) for a four-wheeled vehicle. The injectors 20 shown in FIG. 1 are injectors for the cylinder #1, #2, #3, and #4 from a fuel tank 10 side in this order.

Figure 1:
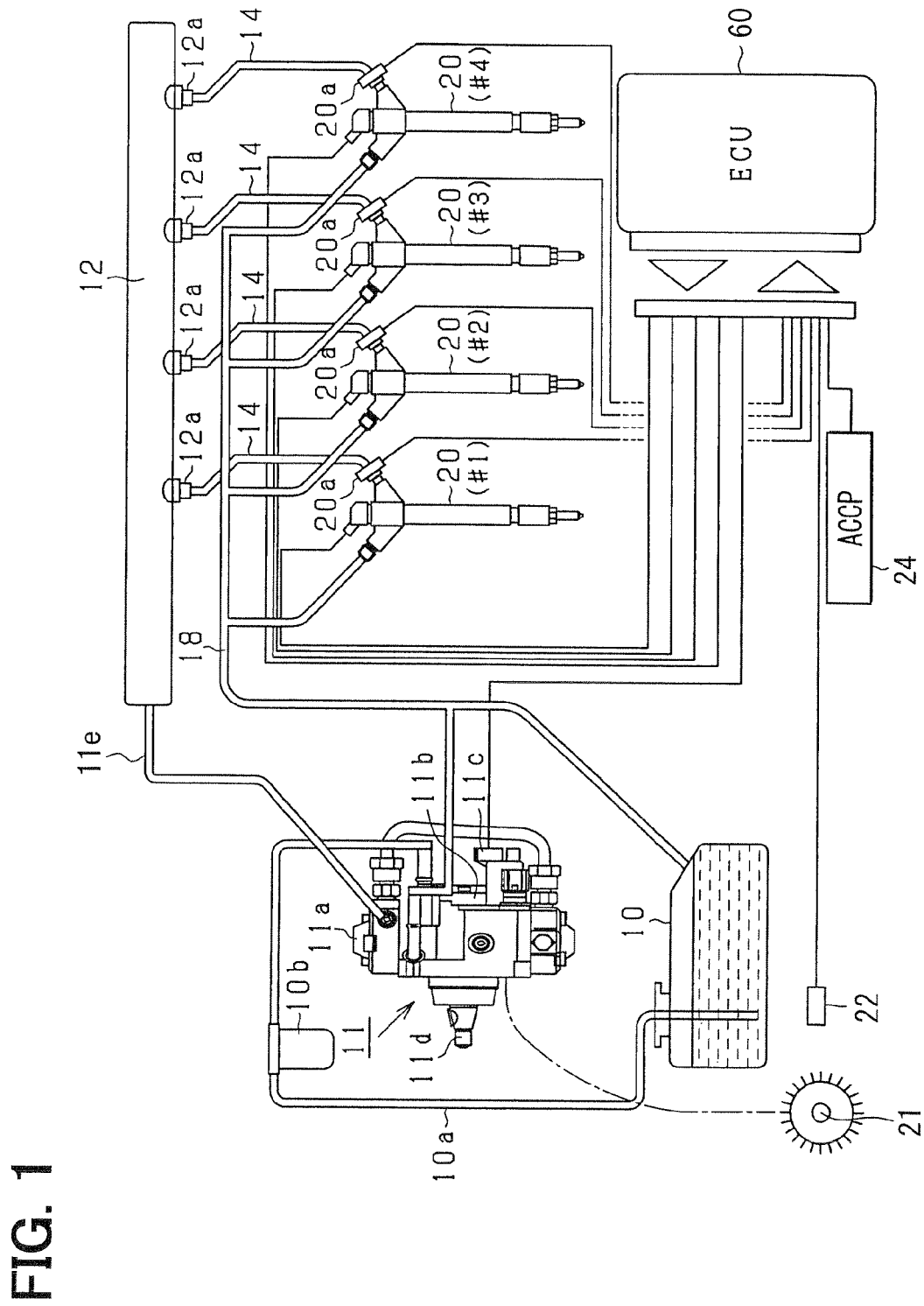
FIG. 1 is a diagram showing a system including a fuel injection control device according to a first embodiment of the present invention.

As shown in FIG. 1, in general, the system is structured such that an ECU 60 (an electronic control unit) takes in sensor outputs (sensing results) from various sensors and controls drive of a fuel supply device based on the respective sensor outputs. The ECU 60 controls drive of various devices constituting a fuel supply system to perform feedback control of conforming fuel injection pressure of the engine to a target value (target fuel pressure), thereby controlling an output (rotation speed or torque) of the diesel engine, for example. In the present embodiment, the fuel injection pressure of the engine is fuel pressure of each time measured with a fuel pressure sensor 20a.

The devices constituting the fuel supply system include the fuel tank 10, a fuel pump 11, and a common rail 12 (a pressure accumulator) in this order from a fuel flow upstream side. Among the devices, the fuel tank 10 and the fuel pump 11 are connected by a pipe 10a via a fuel filter 10b.

The fuel tank 10 is a tank (a vessel) for storing the fuel (the light oil) of the target engine. The fuel pump 11 consists of a low-pressure pump 11a and a high-pressure pump 11b and is structured such that fuel drawn by the low-pressure pump 11a from the fuel tank 10 is pressurized and discharged by the high-pressure pump 11b. A fuel pumping quantity sent to the high-pressure pump 11b and an eventual fuel discharge quantity of the fuel pump 11 are metered by a suction control valve 11c (SCV) provided on a fuel suction side of the fuel pump 11. That is, the fuel pump 11 can control the fuel discharge quantity from the pump 11 to a desired value by regulating drive current (eventually, a valve opening degree) of the suction control valve 11c. For example, the suction control valve 11c is a normally-open type regulating valve that opens when de-energized.

The low-pressure pump 11a out of the two kinds of pumps constituting the fuel pump 11 is constituted as a trochoid feed pump, for example. The high-pressure pump 11b is constituted of a plunger pump, for example. The high-pressure pump 11b is structured to be able to sequentially pump the fuel, which is sent to pressurization chambers, at a predetermined timing by reciprocating predetermined plungers (for example, three plungers) in axial directions thereof with an eccentric cam (not illustrated) respectively. Both pumps 11a, 11b are driven by a drive shaft 11d. The drive shaft 11d is interlocked with a crankshaft 21 as an output shaft of the target engine and rotates at a ratio of 1/1, 1/2 or the like to one revolution of the crankshaft 21. Thus, the low-pressure pump 11a and the high-pressure pump 11b are driven by an output of the target engine.

The fuel in the fuel tank 10 is drawn by the fuel pump 11 through the fuel filter 10b and is pressure-fed (pumped) to the common rail 12 through a pipe 11e (a high-pressure fuel passage). The fuel pumped from the fuel pump 11 is accumulated in the common rail 12 at a high-pressure state, and the accumulated high-pressure fuel is supplied to the injectors 20 (fuel injection valves) of respective cylinders through pipes 14 (high-pressure fuel passages) provided to the respective cylinders. In the system, injection supply (direct injection supply) of the fuel pumped by the drive of the fuel pump 11 is performed directly into each cylinder of the engine through each injector 20. The engine according to the present embodiment is a four-stroke engine. That is, in the engine, one combustion cycle consisting of four strokes of an intake stroke, a compression stroke, a combustion stroke, and an exhaust stroke is serially performed in a cycle of 720° CA.

Each injector 20 is connected also with a low-pressure fuel passage 18 such that the injector 20 can return the fuel to the fuel tank 10 through the low-pressure fuel passage 18.

Thus, the fuel supply system according to the present embodiment has a basic structure similar to that of the conventional system. However, in the fuel injection device according to the present embodiment, the fuel pressure sensor 20a (a fuel passage pressure sensor) is provided to a neighborhood of each of the injectors 20, or more specifically to a fuel inlet of each of the injectors 20, of the respective cylinders #1-#4. With such the construction, a pressure fluctuation mode due to an injection operation and an actual injection of the injector 20 can be sensed with high accuracy.

Figure 2:
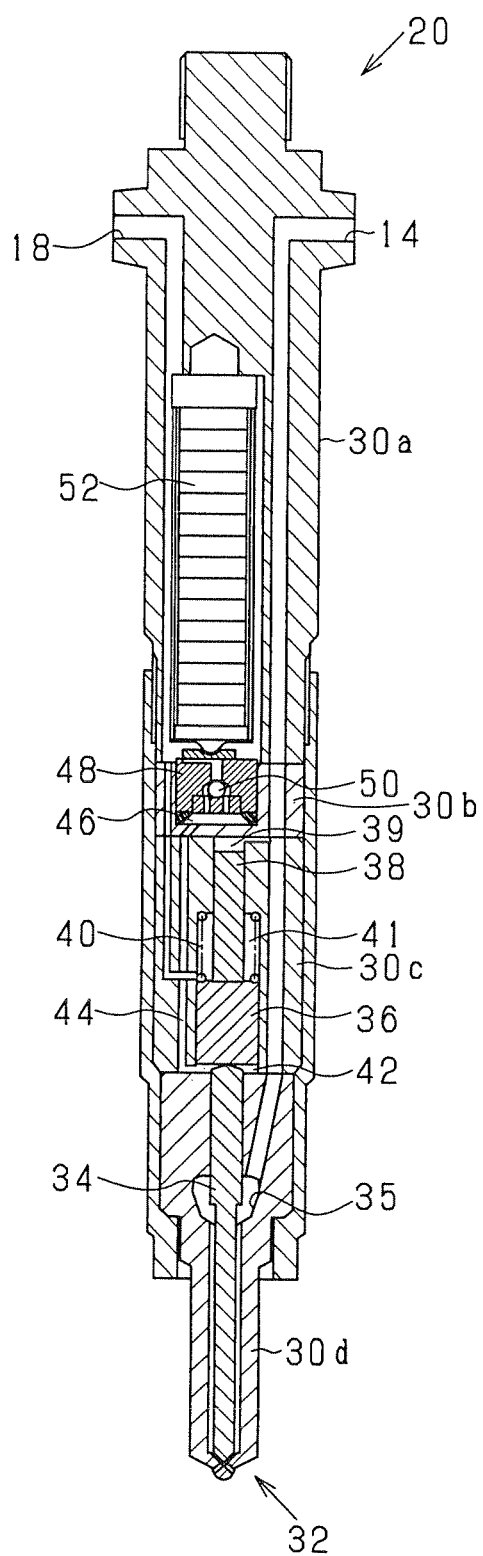
FIG. 2 is a cross-sectional view showing an internal structure of an injector according to the first embodiment.

Next, a structure of the injector 20 will be described in detail with reference to FIG. 2. A detailed internal structure of the injector 20 is shown in FIG. 2. Basically, the four injectors 20(#1)-20(#4) have the same structure (for example, a structure shown in FIG. 2). Each one of the injectors 20 is an injector using the combustion fuel (i.e., the fuel in the fuel tank 10).

The injector 20 has valve bodies 30a, 30b, 30c, 30d consisting of multiple members. An injection hole 32 providing communication between an inside of the valve body 30d and an outside of the injector 20 is formed in a tip portion of the valve body 30d. A needle 34 as a valve member, a needle stopper 36 and a balance piston 38 are located inside the valve bodies 30c, 30d in this order from the tip side of the injector 20 such that the needle 34, the needle stopper 36 and the balance piston 38 can move in an axial direction along inner walls of the valve bodies 30c, 30d. High-pressure fuel is supplied from the high-pressure fuel passage 14 (refer to FIG. 1) to a needle chamber 35 defined by the needle 34 and the inner wall of the valve body 30d and to a balance chamber 39 on a rear side of the balance piston 38.

A back pressure chamber 41 is defined by a face of the needle stopper 36 on an opposite side from the injection hole 32 (referred to as a rear side, hereinafter) and the inner wall of the valve body 30c and communicates with the low-pressure fuel passage 18 (refer to FIG. 1). The fuel from the low-pressure fuel passage 18 is supplied to the back pressure chamber 41. A spring 40 is provided in the back pressure chamber 41 for biasing the needle stopper 36 toward the injection hole 32 side (referred to as a tip side, hereinafter) of the valve body 30c.

A face of the needle stopper 36 on the injection hole 32 side and the inner wall of the valve body 30c define a first oil-tight chamber 42. The first oil-tight chamber 42 is connected with a second oil-tight chamber 46, which is located on a side of the balance piston 38 opposite from the injection hole 32, through a transmission passage 44. The first oil-tight chamber 42, the transmission passage 44, and the second oil-tight chamber 46 are filled with the fuel as a medium for transmitting power.

The second oil-tight chamber 46 is a space defined and formed by a face of a piezo piston 48 on the injection hole 32 side and an inner wall of the valve body 30b. The piezo piston 48 accommodates a check valve 50 inside and is formed such that the fuel can be supplied from the low-pressure fuel passage 18 to the second oil-tight chamber 46. The piezo piston 48 is connected with a piezoelectric element 52 on a rear side of the piezo piston 48.

A multiplicity of layers of the piezoelectric element 52 are stacked to form a laminated body (a piezo stack). The piezo element 52 functions as an actuator by extending and contracting because of the inverse piezoelectric effect. The piezoelectric element 52 is a capacitive load. The piezo electric element 52 extends when charged and contracts when discharged. The piezoelectric element 52 according to the present embodiment uses a piezoelectric element made of a piezoelectric material such as PZT.

When the fuel injection is performed with the injector 20, energization to the piezoelectric element 52 is performed. Thus, the piezoelectric element 52 extends and the piezo piston 48 is displaced toward the injector tip side (injection hole 32 side). As a result, the fuel pressure in the second oil-tight chamber 46, the transmission passage 44 and the first oil-tight chamber 42 increases, and eventually, a force of the fuel in the first oil-tight chamber 42 to push the needle stopper 36 toward the injector rear side increases. If summation of the force and a force of the high-pressure fuel in the needle chamber 35 to push the nozzle needle 34 toward the injector rear side exceeds summation of forces of a spring 40 and low-pressure fuel to push the needle stopper 36 toward the injector tip side and a force of high-pressure fuel in the balance chamber 39 to push a rear side of the balance piston 38 toward the injector tip side, the needle 34 is displaced toward the injector rear side and the injector 20 opens. Thus, the fuel inside the injector 20 is injected to an outside through the injection hole 32.

When the fuel injection by the injector 20 is stopped, an electrostatic energy stored between electrodes of the piezoelectric element 52 is discharged. Thus, the piezoelectric element 52 contracts and the piezo piston 48 is displaced toward the injector rear side. As a result, the fuel pressure in the second oil-tight chamber 46, the transmission passage 44 and the first oil-tight chamber 42 decreases, and eventually, the force of the fuel in the first oil-tight chamber 42 to push the needle stopper 36 toward the injector rear side decreases. If summation of the force and the force of the high-pressure fuel in the needle chamber 35 to push the nozzle needle 34 toward the injector rear side falls below the summation of the forces of the spring 40 and the low-pressure fuel to push the needle stopper 36 toward the injector tip side and the force of the high-pressure fuel in the balance chamber 39 to push the rear side of the balance piston 38 toward the injector tip side, a force directed toward the injector tip side is applied to the needle 34 and eventually the injector 20 closes. Thus, the fuel injection by the injector 20 is stopped.

In the injector 20, a displacement amount of the needle 34 (i.e., a reciprocating amount) toward the injector rear side, i.e., a lift amount, changes continuously in accordance with a displacement amount of the piezoelectric element 52, and eventually, the injection command to the aforementioned injector 20.

Next, a construction of a driver unit 61 that performs drive control of such the piezoelectric element 52 will be explained in detail with reference to FIG. 3. The driver unit 61 is incorporated in the ECU 60 and has a drive circuit 70, a controller 71 for controlling the drive circuit 70 and the like.

Figure 3:
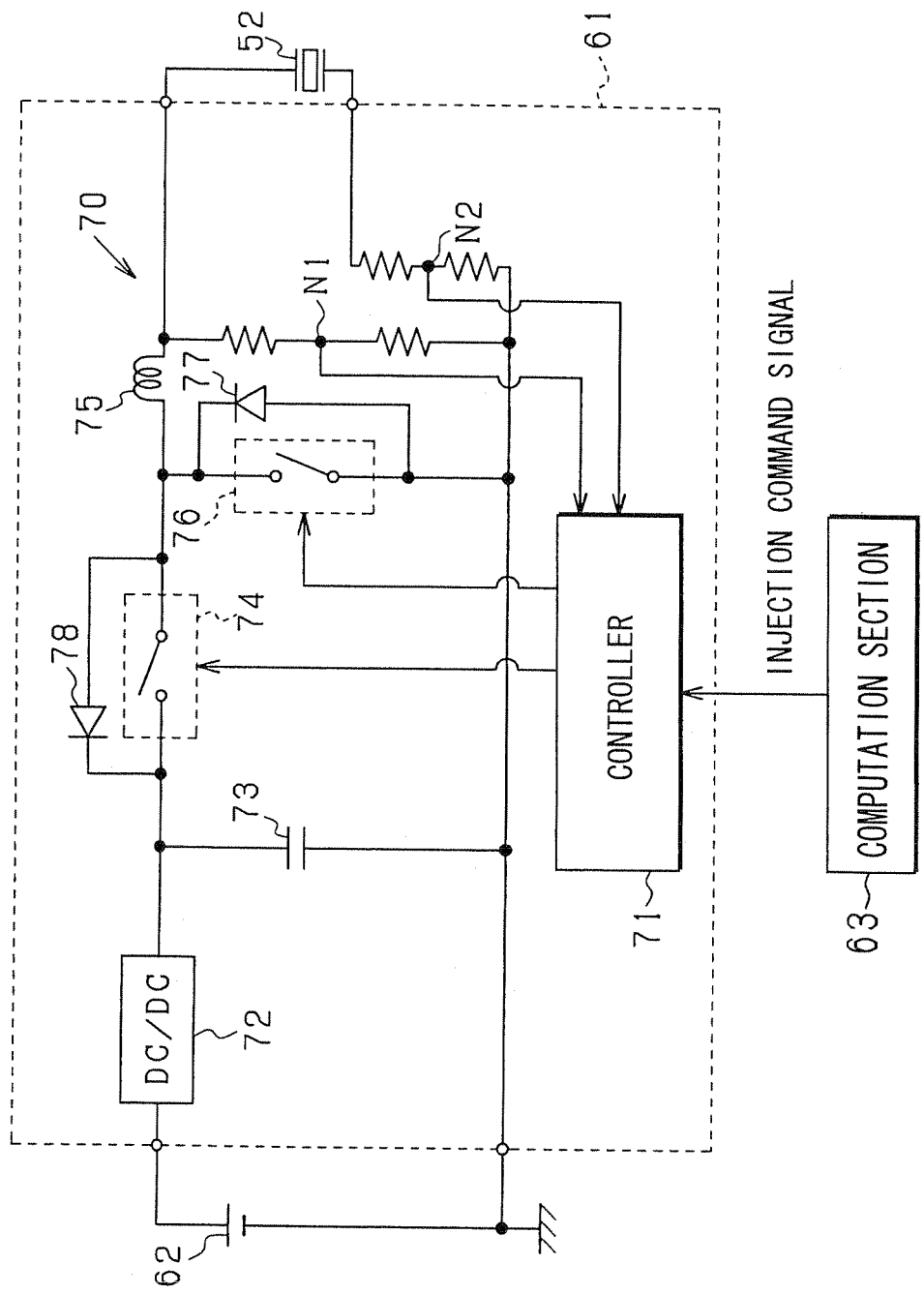
FIG. 3 is a diagram showing a driver unit for driving the injector according to the first embodiment.

As shown in FIG. 3, an electric power supplied to the driver unit 61 from a battery 62 is supplied to a DC-DC converter 72 of the drive circuit 70. The DC-DC converter 72 is a booster circuit that boosts a voltage (for example, 12V) of the battery 62 to a high voltage (for example, 200 to 300V) for charging the piezoelectric element 52.

The boosted voltage of the DC-DC converter 72 is applied to a capacitor 73. A terminal of the capacitor 73 is connected to the DC-DC converter 72 and the other terminal of the capacitor 73 is grounded. If the boosted voltage of the DC-DC converter 72 is applied to the capacitor 73, the capacitor 73 stores the electrostatic energy to be supplied to the piezoelectric element 52.

A high-potential terminal of the capacitor 73, i.e., the terminal on the DC-DC converter 72 side, is connected to a high-potential terminal of the piezoelectric element 52 through a series connection body of a charge switch 74 and a charge-discharge coil 75. A low-potential terminal of the piezoelectric element 52 is grounded. A terminal of a discharge switch 76 is connected between the charge switch 74 and the charge-discharge coil 75, and the other terminal of the discharge switch 76 is grounded.

A diode 77 is connected in parallel with the discharge switch 76 such that a forward direction of the diode 77 coincides with a direction from the ground to a point between the capacitor 73 and the charge-discharge coil 75. The diode 77, the capacitor 73, the charge switch 74 and the charge-discharge coil 75 constitute a chopper circuit for charging the piezoelectric element 52. The diode 77 functions as a freewheeling diode.

A diode 78 is connected in parallel with the charge switch 74 such that a forward direction of the diode 78 coincides with a direction from the discharge switch 76 to the capacitor 73. The diode 78, the capacitor 73, the charge-discharge coil 75 and the discharge switch 76 constitute a chopper circuit for discharging the electrostatic energy stored in the piezoelectric element 52. The diode 78 functions as a freewheeling diode.

Figure 4:
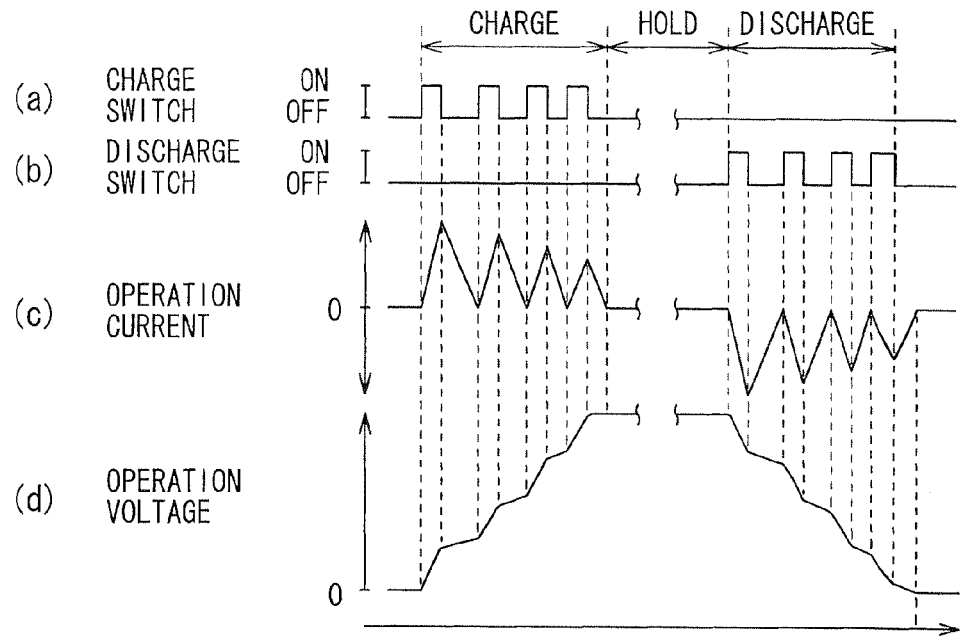
FIG. 4 is a timing chart showing an operation mode of a piezoelectric element of the injector according to the first embodiment.

The drive circuit 70 having the above-described construction is controlled by the controller 71. More specifically, the controller 71 controls ON and OFF of the charge switch 74 and the discharge switch 76 based on an injection command signal from a computation section 63 (part for performing computation concerning injection control including processing of S12 and S13 of FIG. 5 described later), a voltage (operation voltage) of the piezoelectric element 52 sensed through a node N1, and current (operation current) that flows through the piezoelectric element 52 and that is sensed through a node N2. The injection command signal from the above-described computation section 63 includes a basic waveform of an injection rate (acquired in S12 of FIG. 5), an injection timing signal (produced in S13 of FIG. 5) for directing the injection timing, and the like. The respective operations are performed in a mode shown in FIG. 4. In FIG. 4, part (a) shows a transition of an operation mode of the charge switch 74, part (b) shows a transition of an operation mode of the discharge switch 76, part (c) shows a transition of the operation current of the piezoelectric element 52, and part (d) shows a transition of the operation voltage of the piezoelectric element 52.

As shown in FIG. 4, the piezoelectric element 52 is charged while increasing and decreasing the operation current through chopper control of on-off operation of the charge switch 74. More specifically, a closed loop circuit consisting of the capacitor 73, the charge switch 74, the charge-discharge coil 75 and the piezoelectric element 52 is formed by the ON operation (i.e., switch-on operation) of the charge switch 74. Thus, the electrostatic energy stored in the capacitor 73 is used to charge the piezoelectric element 52. At this time, the current flowing through the piezoelectric element 52 increases. When OFF operation (i.e., switch-off operation) of the charge switch 74 is performed after the ON operation of the charge switch 74, a closed loop circuit consisting of the charge-discharge coil 75, the piezoelectric element 52 and the diode 77 is formed. Thus, a flywheel energy of the charge-discharge coil 75 is charged to the piezoelectric element 52. At this time, the current flowing through the piezoelectric element 52 decreases.

The step-down chopper control of operating the charge switch 74 in the above-described mode is performed. Thus, the piezoelectric element 52 is charged and an electric potential at the high-potential terminal of the piezoelectric element 52 increases. A charge start timing is defined by a rising timing of a drive pulse signal.

The piezoelectric element 52 is discharged while increasing and decreasing the operation current through chopper control of on-off operation of the discharge switch 76. In detail, a closed loop circuit consisting of the discharge switch 76, the charge-discharge coil 75 and the piezoelectric element 52 is formed by ON operation of the discharge switch 76. Thus, the piezoelectric element 52 is discharged. At this time, the current flowing through the piezoelectric element 52 increases. Furthermore, when OFF operation of the discharge switch 76 is performed after the ON operation of the discharge switch 76, a closed loop circuit consisting of the capacitor 73, the diode 78, the charge-discharge coil 75 and the piezoelectric element 52 is formed. Thus, the flywheel energy of the charge-discharge coil 75 is collected to the capacitor 73.

The step-up chopper control of operating the discharge switch 76 in the above-described mode is performed. Thus, the piezoelectric element 52 is discharged and the electric potential at the high-potential terminal of the piezoelectric element 52 falls. A discharge start timing is defined by a falling timing of the drive pulse signal.

The ECU 60 is the main part that performs engine control as an electronic control unit in the system. The ECU 60 (engine control ECU) has a well-known microcomputer (not shown). The ECU 60 grasps an operation state of the target engine and requests from the user based on the sensing signals of the above-described various types of sensors and operates the suction control valve 11c, the injectors 20 and the like in accordance with the engine operation state and the requests. Thus, the ECU 60 performs various kinds of control concerning the engine in the optimum mode corresponding to the current situation. Fundamentally, the microcomputer mounted in the ECU 60 consists of various kinds of computing units, storage devices, signal processing devices, communication devices, power supply circuits and the like such as a CPU (a basic processing unit) for performing various kinds of computation, a RAM (a random access memory) as a main memory for temporarily storing data in the progress of the computation, results of the computation and the like, a ROM (a read-only memory) as a program memory, an EEPROM (an electrically rewritable nonvolatile memory) as a memory for data storage, a backup RAM (a memory invariably supplied with power from a backup power supply such as an in-vehicle battery even after a main power supply of the ECU 60 is stopped), signal processing devices such as an A/D converter and a clock generation circuit, and input/output ports for inputting/outputting the signals from/to an exterior. Various kinds of programs, control maps and the like concerning the engine control including programs concerning injection characteristic sensing and injection command correction are beforehand stored in the ROM, and the various kinds of control data including design data of the target engine are beforehand stored in the memory for data storage (for example, the EEPROM).

In the present embodiment, the ECU 60 calculates torque (request torque) that should be generated in the output shaft (the crankshaft 21) at the time and eventually a fuel injection quantity for satisfying the request torque based on the various kinds of the sequentially inputted sensor outputs (sensing signals). Thus, the ECU 60 variably sets the fuel injection quantity of the injector 20 to control indicated torque (generation torque) generated through the fuel combustion in each cylinder (a combustion chamber) and shaft torque (output torque) actually outputted to the output shaft (the crankshaft 21). That is, the ECU 60 controls the shaft torque to the request torque. For example, the ECU 60 calculates the fuel injection quantity corresponding to the engine operation state, the operation amount of the accelerator by the driver and the like at each time and outputs an injection control signal for directing the fuel injection of the calculated fuel injection quantity to the injector 20 in synchronization with a desired injection timing. The injector 20 injects the fuel based on the injection control signal. Thus, the output torque of the target engine is controlled to the target value.

As is well known, in the diesel engine, an intake throttle valve (a throttle) provided in an intake passage of the engine is held at a substantially fully-opened state during a steady operation for the purpose of increase in a fresh air quantity, reduction in a pumping loss and the like. Therefore, control of the fuel injection quantity is a main part of the combustion control during the steady operation (specifically, the combustion control concerning torque adjustment).

Hereafter, a basic processing procedure of the fuel injection control according to the present embodiment will be explained with reference to FIG. 5.

Figure 5:
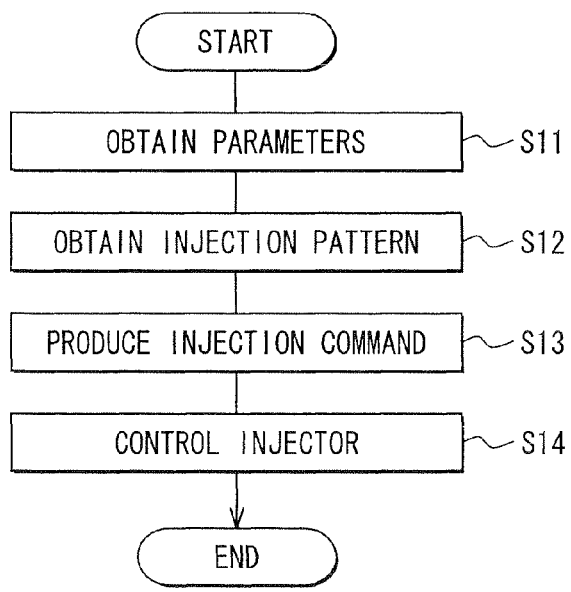
FIG. 5 is a flowchart showing a flow of a fuel injection control program according to the first embodiment.

Values of various parameters used in the processing shown in FIG. 5 are stored at any time in the storage device mounted in the ECU 60 such as the RAM, the EEPROM or the backup RAM and are updated at any time when necessary. Fundamentally, a series of processing shown in FIG. 5 is serially performed at a frequency of one time per combustion cycle for each cylinder of the target engine through execution of the program stored in the ROM by the ECU 60. That is, with the program, fuel supply to all the cylinders except a dormant cylinder is performed during one combustion cycle.

As shown in FIG. 5, first in S11 (S means "Step") in a series of the processing, predetermined parameters such as the current engine rotation speed (i.e., an actual measurement value measured by a crank angle sensor 22) and the fuel pressure (i.e., an actual measurement value measured by the fuel pressure sensor 20a) are read and also an accelerator operation amount ACCP (i.e., an actual measurement value measured by an accelerator sensor 24) achieved by the driver at the time and the like are read. Then, in following S12, the injection pattern is set based on the various parameters read in S11 (and also by separately calculating the request torque including losses due to external loads and the like when necessary).

The injection pattern is obtained based on a predetermined reference map (an injection control map or a mathematical expression) and a correction coefficient stored in the ROM, for example. More specifically, for example, the optimum injection patterns (adaptation values) are beforehand obtained by experiment and the like in anticipated ranges of the predetermined parameters (read in S11) and are written in the map, for example. For example, the injection pattern is defined by parameters such as the number of injection stages (i.e., the time number of injections performed in one combustion cycle), a fuel injection timing of each injection (i.e., an injection timing) and a basic waveform of an injection rate (such as a trapezoid or a boot shape). The above-described map indicates the relationship between the parameters and the optimum injection pattern.

In following S13, an injection timing signal (an injection command) for directing the injection timing to the controller 71 (FIG. 3) is produced based on the injection pattern (specifically, the above-described injection timing) acquired in S12. The injection signal corresponding to the thus produced injection pattern is used in following S14. That is, in S14, the injection timing signal is outputted to the controller 71 (FIG. 3) together with the basic waveform acquired in S12. Thus, the controller 71 produces an operation current signal (equivalent to a target value of the operation current) corresponding to the signals (the injection command signals) and controls the on/off states of the charge switch 74 and the discharge switch 76 (FIG. 3) in accordance with the thus produced operation current signal. Thus, the drive of the injector 20 (more specifically, the drive relating to the injection) is controlled, and the injection rate waveform is controlled to the above-described basic waveform (acquired in S12). With the drive control of the injector 20, the series of the processing shown in FIG. 5 is ended. In the present embodiment, through a series of such the processing, a pilot injection, a pre-injection, an after injection, a post-injection and the like are arbitrarily performed with a main injection in accordance with the situation of the vehicle and the like.

Next, a mode of the fuel injection control by such the processing shown in FIG. 5 will be explained with reference to FIGS. 6 and 7.

Figure 6:
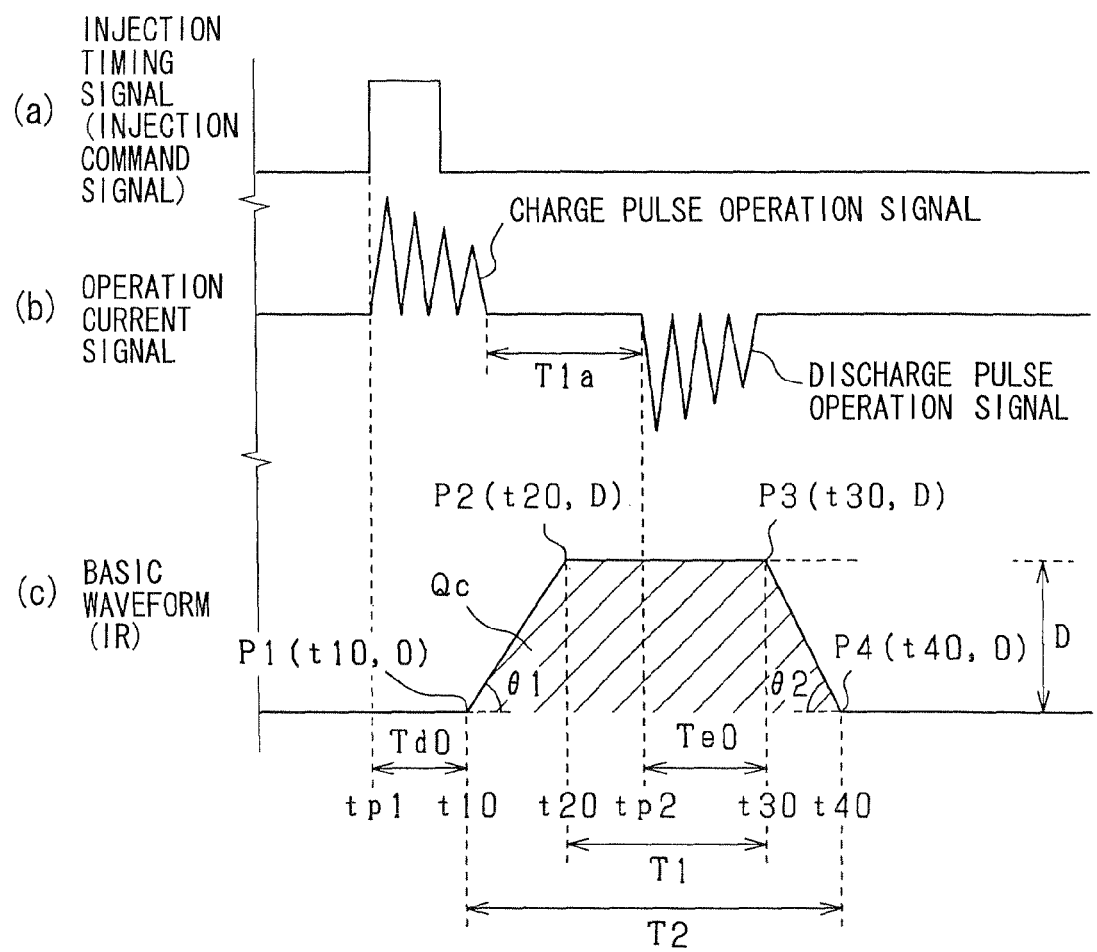
FIG. 6 is a timing chart showing a production mode of an operation current signal according to the first embodiment.

An example of the injection command signals and the operation current signal produced from the injection command signals are shown in FIG. 6 as a time chart. The basic waveform of this example takes the form of a trapezoid. In FIG. 6, part (a) shows the injection timing signal produced in S13 of FIG. 5, part (b) shows the operation current signal produced by the controller 71 based on the above-described injection command signal, and part (c) shows the basic waveform of the injection rate acquired in S12 of FIG. 5.

As shown in part (c) of FIG. 6, in this example, the basic waveform obtained in S12 of FIG. 5 is indicated by first to four apexes P1 to P4 in FIG. 6, i.e., timings t10, t20, t30, t40 and height D of the trapezoid. An area Qc of the trapezoid equivalent to the fuel injection quantity can be expressed by an expression: $Qc=\frac{1}{2} \times D \times (T1+T2)$. In the expression, T1 represents a period from the second apex P2 to the third apex P3 (i.e., a period from t20 to t30) (equivalent to an upper base of the trapezoid) and T2 is a period from the first apex P1 to the fourth apex P4 (i.e., a period from t10 to t40) (equivalent to a lower base of the trapezoid). In the case of such the trapezoidal injection, the area Qc is equivalent to a target value of a total injection quantity of a single injection.

In order to decide the timing (an injection start timing) for performing the injection with the injection rate transition having such the trapezoidal profile, the above-described injection timing signal is produced in S13 of FIG. 5 based on the injection timing of the injection pattern acquired in S12. That is, a rising timing tp1 of the above-described injection timing signal (part (a) of FIG. 6) is set in accordance with a timing (an injection timing of the injection pattern), at which the timing t10 of the first apex P1 of the trapezoid (part (c) of FIG. 6) defined by the basic waveform is desired to be set. However, practically, there is a delay (for example, a delay Td0) since the rising timing tp1 is outputted until the injection is started (executed). Therefore, anticipating the delay before-hand, the rising timing tp1 is set at a timing earlier than the timing, at which the timing t10 is desired to be set, by the delay Td0.

In S14 of FIG. 5, the above-described operation current signal is produced based on the above-described injection command signals (the basic waveform and the injection timing signal). That is, the rising timing tp1 of the above-described injection timing signal (part (a) of FIG. 6) is set as an energization start timing of a charge (positive) pulse operation current (refer to FIG. 4 and part (b) of FIG. 6). In addition, an energization start timing tp2 of a discharge (negative) pulse operation current (refer to FIG. 4 and part (b) of FIG. 6) is set in accordance with the timing t30 of the third apex P3 of the above-described basic waveform. However, practically, there is a delay (for example, a delay Te0) since the discharge pulse operation current flows until the injection rate decreases. Therefore, anticipating the delay, the energization start timing tp2 of the discharge pulse operation current is set at a timing earlier than a timing, at which the timing t30 is required to be set actually, by the delay Te0.

In the actual injection rate waveform, portions corresponding to an angle θ1 of the first apex P1 and an angle θ2 of the fourth apex P4 shown in part (c) of FIG. 6 respectively change in accordance with pulse width of the charge (positive) pulse operation current signal and pulse width of the discharge (negative) pulse operation current signal (shown in part (b) of FIG. 6). Therefore, the controller 71 variably sets the pulse width of the respective operation current signals, i.e., the pulse width of the charge pulse operation current signal and the pulse width of the discharge pulse operation current signal, in accordance with the angles θ1, θ2 in the basic waveform (which is received as the above-described injection command signal). More specifically, the pulse width of the charge pulse operation current signal is set larger as the angle θ1 (the rising angle of the injection rate waveform) increases. The pulse width of the discharge pulse operation current signal is set larger as the angle θ2 (the falling angle of the injection rate waveform) increases.

In the actual injection rate waveform, a portion corresponding to length T1 of a stable interval from the second apex P2 to the third apex P3 as the upper base in part (c) of FIG. 6 changes in accordance with length T1a (part (b) pf FIG. 6) of an operation current holding period, in which both of the charge pulse operation current signal and the discharge pulse operation current signal are held at a reference level (i.e., a zero level). Therefore, the controller 71 variably sets the length T1a of the operation current holding period in accordance with the length T1 of the stable interval in the basic waveform (which is received as the injection command signal). More specifically, the length T1a of the operation current holding period is increased as the length T1 increases.

Figure 7:
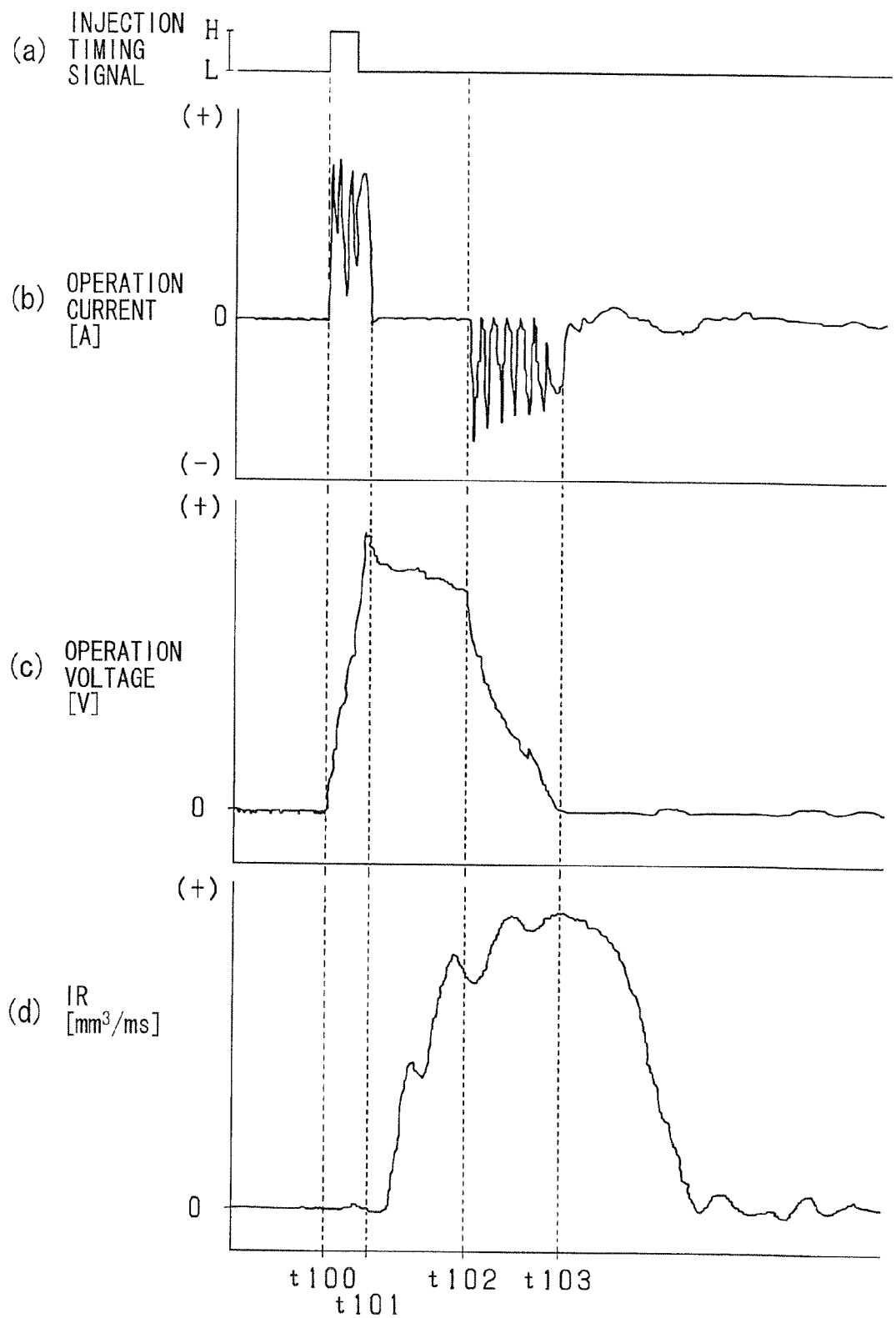
FIG. 7 is a timing chart showing an example of transitions of parameters concerning an injection during fuel injection control according to the first embodiment.

FIG. 7 is a timing chart showing an example of transitions of parameters concerning an injection at the time when the fuel injection control of the above-described injector 20 is performed based on the injection command signals and the operation current signal shown in FIG. 6. In FIG. 7, part (a) shows the injection timing signal, part (b) shows the operation current flowing through the piezoelectric element 52 based on the operation current signal, part (c) shows an operation voltage applied to the piezoelectric element 52, and part (d) shows a transition of the injection rate IR (an injection rate waveform) of the injection performed based on the operation current signal shown in part (b).

As shown in FIG. 7, on the occasion of the fuel injection control, the operation current (shown in part (b) of FIG. 7) indicating multiple positive pulse waveforms is first outputted to the charge switch 74 (FIG. 3) based on the charge pulse operation current signal produced by the above-described controller 71 (FIG. 3) in order to raise the injection rate waveform. As a result, the operation current to be used for charging the piezoelectric element 52 flows and the operation voltage rises in an interval from a timing t100 to a timing t101. Thus, the lift amount of the needle 34 (FIG. 2) increases and the fuel quantity injected through the injection hole 32 (FIG. 2) per unit time, i.e., the injection rate IR, increases. As a result, the portion from the first apex P1 to the second apex P2 in the basic waveform (the trapezoid) shown in part (c) of FIG. 6 is obtained.

After that, in an interval from the timing t101 to a timing t102, both of the charge pulse signal and the discharge pulse signal are maintained at the reference level (the zero level) in order to obtain the portion corresponding to the upper base of the basic waveform (the trapezoid) (i.e., the stable interval from the second apex P2 to the third apex P3 in part (c) of FIG. 6).

Then, in order to lower the injection rate waveform, the operation current (shown in part (b) of FIG. 7) indicating multiple negative pulse waveforms is outputted to the discharge switch 76 (FIG. 3) based on the discharge pulse operation current signal produced by the above-described controller 71 (FIG. 3). As a result, the operation current accompanying the discharge of the electrostatic energy stored in the piezoelectric element 52 flows and the operation voltage lowers in an interval from the timing t102 to a timing t103. Thus, the lift amount of the needle 34 (FIG. 2) decreases, and the fuel quantity injected through the injection hole 32 (FIG. 2) per unit time, i.e., the injection rate IR, decreases. As a result, the portion from the third apex P3 to the fourth apex P4 in the basic waveform (the trapezoid) shown in part (c) of FIG. 6 is obtained.

Thus, the trapezoidal injection rate waveform corresponding to the basic waveform can be acquired by the processing of S14 of FIG. 5.

In the present embodiment, a transition of fuel pressure fluctuation (i.e., a fuel pressure waveform) accompanying a predetermined injection of a target injector 20 (an injector of a predetermined cylinder) is sensed based on the output of the fuel pressure sensor 20a while performing the above-described injection control. Then, a timing concerning the predetermined injection (an injection start timing in the present embodiment) is detected based on the thus sensed fuel pressure waveform. Based on the detection value of the timing, an operation signal for approximating a total injection quantity of the one time of the injection to a reference value of the same parameter is calculated during the execution of the predetermined injection. The piezoelectric element 52 (FIG. 2) is operated with the operation signal. More specifically, in order to compensate the error in the total injection quantity due to deviation of the injection start timing, an injection end timing based on the above-described injection pattern (S12 of FIG. 5) is corrected in real time. Thus, the injection end timing of the currently executed injection is set at an appropriate timing (which is set based on the operation signal of the piezoelectric element 52), and the total injection quantity from the injection start to the injection end is controlled to a desired value (a reference value).

Next, a mode in the case of detecting the injection start timing based on the output of the fuel pressure sensor 20a will be explained in detail with reference to FIGS. 8 to 10.

On the occasion of the detection of the injection timing, the output of the fuel pressure sensor 20a is taken in first, and then, a first order differential value dP and a second order differential value ddP of the fuel pressure P at each timing are calculated from the output. FIG. 8 is a flowchart showing a series of processing concerning the data acquisition (obtainment and storage of the sensor output: learning processing) and differential value calculation. Fundamentally, a series of processing shown in FIG. 8 is serially performed at a predetermined interval (e.g., at an interval of 20 μsec) through execution of a program stored in the ROM by the ECU 60.

Figure 8:
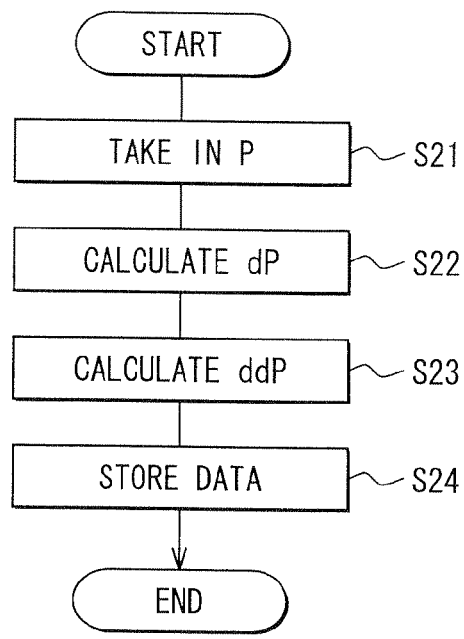
FIG. 8 is a flowchart showing a flow of a program concerning fuel pressure acquisition and differential value calculation according to the first embodiment.

As shown in FIG. 8, in a series of the processing, first in S21, the output of the fuel pressure sensor 20a is taken. In following S22, a pressure first order differential value dP is calculated as a difference between a previous value and a present value of the pressure value P (i.e., dP=P(present)−P (previous)). In following S23, a pressure second order differential value ddP is calculated as a difference between a previous value and a present value of the first order differential value dP (i.e., ddP=dP(present)−dP(previous)). Then, in following S24, the respective data P, dP, ddP are stored and the series of the processing is ended.

Figure 9:
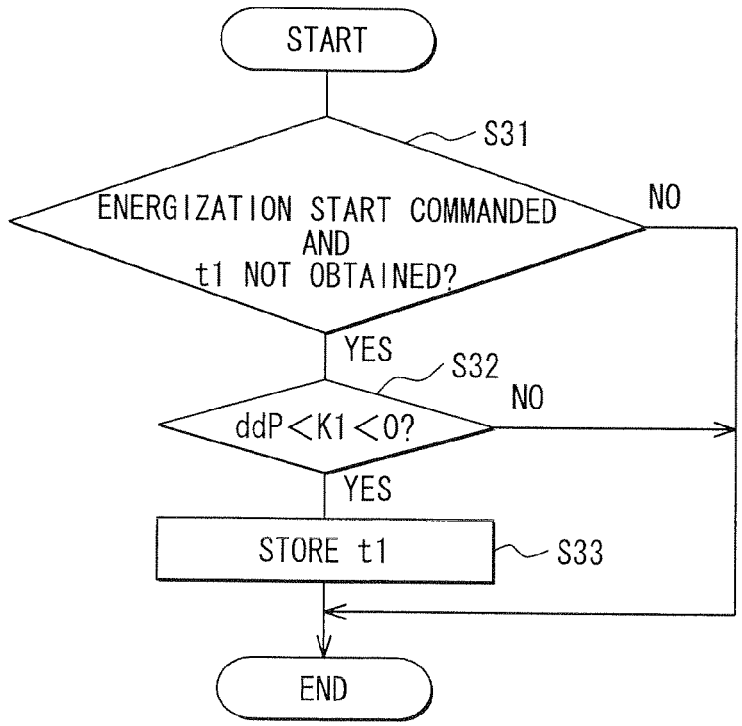
FIG. 9 is a flowchart showing a flow of an injection start timing detection program according to the first embodiment.

FIG. 9 is a flowchart showing a flow of a program for detecting the injection start timing t1 (the timing corresponding to the timing t10 in FIG. 6) based on the pressure second order differential value ddP calculated in S23 of FIG. 8. The program is also serially executed by the ECU 60 in a predetermined cycle (for example, at an interval of 20 μsec).

As shown in FIG. 9, in a series of the processing, first in S31, it is determined whether the injection command (the energization start command) has been outputted and the injection start timing t1 has not been detected yet concerning the predetermined injection. Only when it is determined in S31 that the injection command has been outputted and the injection start timing t1 has not been detected yet concerning the injection, processing from S32 is performed. That is, a period in which the condition of S31 is satisfied corresponds to a detection period of the injection start timing t1.

In S32, it is determined whether the pressure second order differential value ddP calculated in S23 of FIG. 8 is smaller than a predetermined threshold value K1 (i.e., whether ddP<K1).

The threshold value K1 is set at a value smaller than 0 (i.e., K1<0), i.e., a negative value. On the occasion of the setting of the value K1, the value K1 is variably set based on multiple maps obtained through experiments and the like beforehand. This responds to a phenomenon that an inclination of the pressure drop accompanying the injection start changes in accordance with fuel pressure immediately before the injection, an injection execution timing, and cylinder pressure. That is, the threshold value K1 is set at a smaller value (i.e., at a larger value on the negative side) as the inclination of the pressure drop becomes steeper.

Figure 10A:
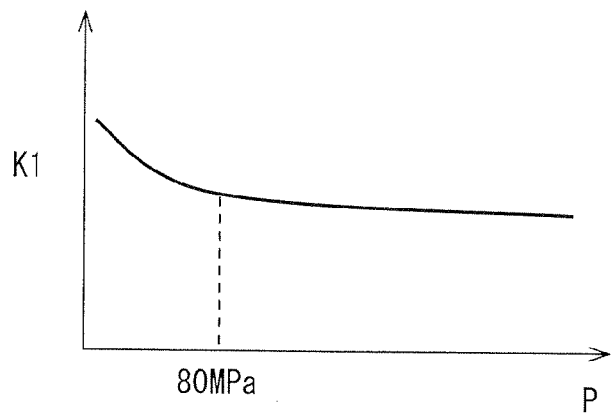
FIGS. 10A to 10C are maps for variably setting a threshold value used for detection of the injection start timing according to the first embodiment.

FIG. 10A is a map showing a relationship between the fuel pressure level P (i.e., the actual measurement value measured by the fuel pressure sensor 20a) and an adaptation value (i.e., the optimum value) of the threshold value K1 obtained by experiment and the like. As shown in FIG. 10A, according to the map, the threshold value K1 is set at a smaller value as the fuel pressure level P increases before the fuel pressure level P reaches a convergence point (80 MPa, in this example). If the fuel pressure level P reaches the convergence point, a degree of the decrease in the threshold value K1 with respect to the increase in the fuel pressure level P becomes very small.

Figure 10B:
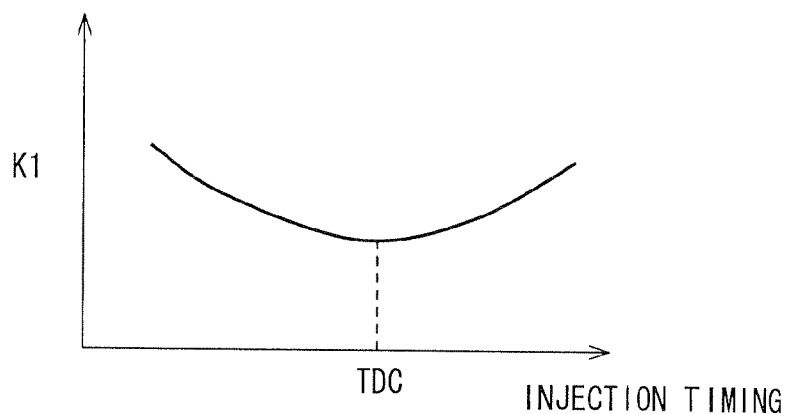

FIG. 10B is a map showing a relationship between the injection execution timing and an adaptation value (i.e., the optimum value) of the threshold value K1 obtained through experiment and the like. The injection execution timing is detected as the injection start command timing indicated by the injection start command to the injector 20, or more specifically, as the rising timing of the injection command pulse (i.e., the energization start timing). As shown in FIG. 10B, according to the map, the threshold value K1 is set at a smaller value as the injection execution timing comes closer to TDC (top dead center).

Figure 10C:
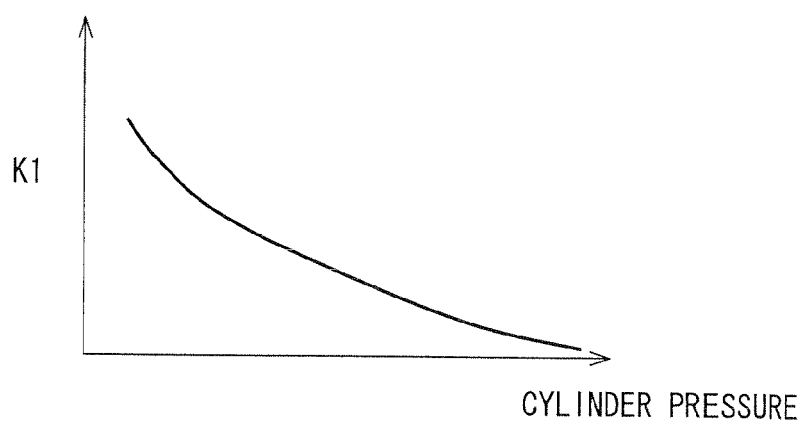

FIG. 10C is a map showing a relationship between the pressure inside the cylinder of the target engine (i.e., an actual measurement value measured by a cylinder pressure sensor, for example) and an adaptation value (i.e., the optimum value) of the threshold value K1 obtained by experiment and the like. As shown in FIG. 10O, according to the map, the threshold value K1 is set at a smaller value as the cylinder pressure increases.

Thus, in the present embodiment, the threshold value K1 is variably set in accordance with the inclination of the pressure drop. Thus, the pressure drop and eventually the injection start timing t1 can be detected with high accuracy.

The processing in S32 is repeatedly performed during the detection period of the timing t1. If it is determined in S32 that the pressure second order differential value ddP is not smaller than the threshold value K1, the series of processing of FIG. 9 is ended. If it is determined in S32 that the pressure second order differential value ddP is smaller than the threshold value K1, the present timing is stored as the injection start timing t1 in a predetermined storage device in following S33.

Thus, in the present embodiment, the timing when the pressure drop accompanying the injection start occurs, or eventually the injection start timing t1, is detected as the timing (a cross point), at which the pressure second order differential value ddP shifts from the larger side to the smaller side than the threshold value K1. With such the detection scheme, the above-described pressure drop can be grasped appropriately, and eventually the injection start timing can be detected with high accuracy.

Figure 11:
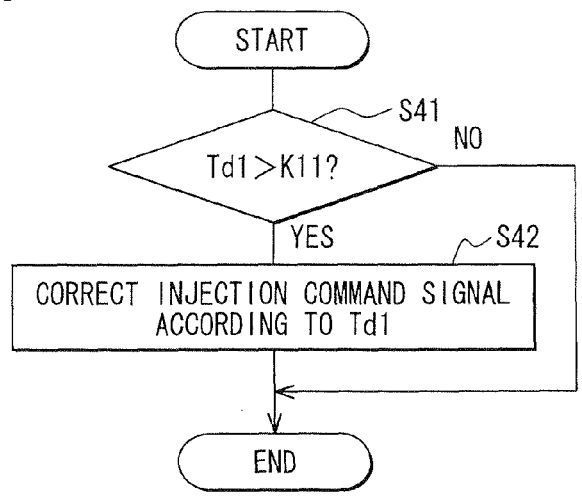
FIG. 11 is a flowchart showing a flow of an injection command correction program according to the first embodiment.

FIG. 11 is a flowchart showing a flow of a program (an injection command correction program) for correcting the above-described injection command signal (specifically, the basic waveform) based on the injection start timing calculated as the result of execution of the injection start timing calculation program. In the processing based on the program, first in S41, it is determined whether the injection start timing t1 obtained by the processing of FIG. 9 is deviated from a corresponding reference timing (the timing t10 shown in FIG. 6). Only when it is determined that there occurs a deviation, processing of S42 is performed. In detail, it is determined in S41 whether the deviation Td1 of the injection start timing t1 from the corresponding reference timing t10 is larger than a threshold value K11.

In S42, the injection command signal is corrected to approximate a total injection quantity to a corresponding reference value based on the deviation Td1 of the injection start timing t1 from the corresponding reference timing t10. More specifically, for example, the injection command signal is corrected to extend or contract the stable interval T1 (equivalent to the upper base of the trapezoid shown in part (c) of FIG. 6) in the basic waveform by the amount Td1 in accordance with the deviation of the injection start timing t1. Thus, in the controller 71 (FIG. 3), the operation current holding period T1a (shown in part (b) of FIG. 6) of the operation current signal is extended or shortened. As a result, the reference timing t30 (shown in part (c) of FIG. 6) of the injection end timing is adjusted (changed) by the amount Td1. Thus, the total injection quantity can be approximated to the corresponding reference value by adjusting the injection end timing.

Figure 12:
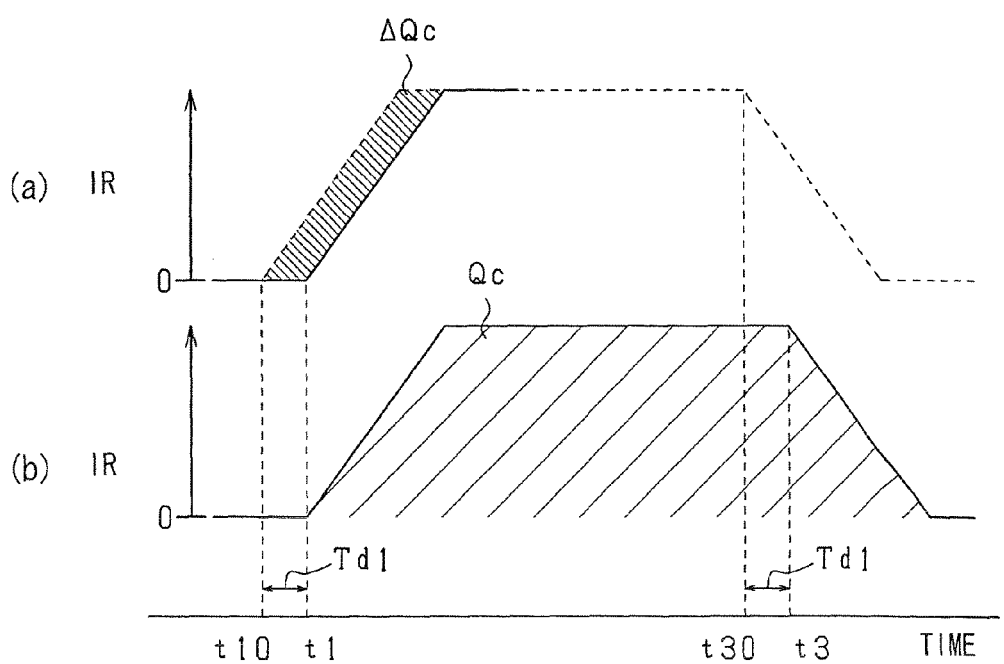
FIG. 12 is a timing chart showing a processing mode of injection command correction processing according to the first embodiment.
Figure 13:
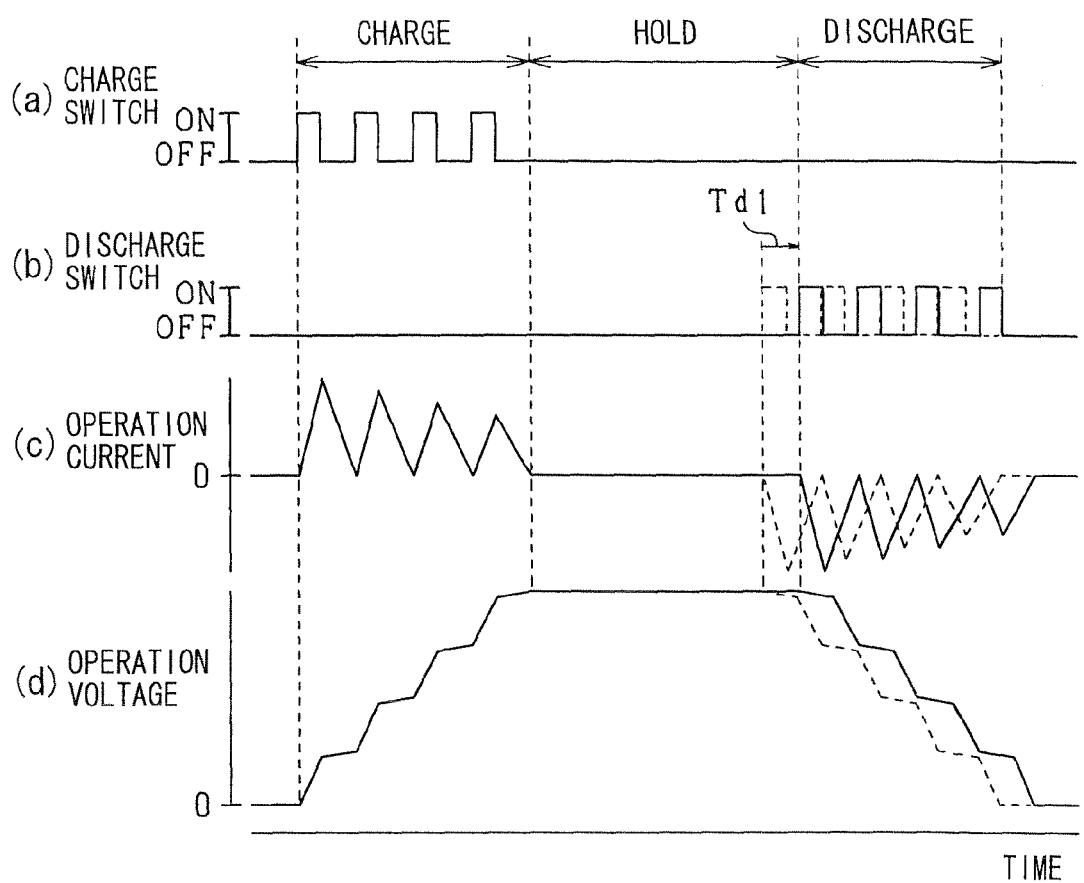
FIG. 13 is a timing chart showing a processing mode of the injection command correction processing according to the first embodiment.

For example, as shown in part (a) of FIG. 12, when the injection start timing t1 delays from the corresponding reference timing t10 by the amount Td1, the stable interval T1 (the upper base of the trapezoid) in the basic waveform is lengthened by the delay Td1. As a result, the operation current holding period T1a (part (b) of FIG. 6) is extended, and the reference timing t30 of the injection end timing delays by the amount Td1. Thus, by delaying the generation timing of the discharge pulse operation current signal as shown in part (c) of FIG. 13 (from a broken line to a solid line), a decrease ΔQc of the injection quantity (shown by a shaded area in part (a) of FIG. 12) due to the delay of the injection start timing t1 can be compensated as shown in part (b) of FIG. 12. As a result, the total injection quantity Qc can be adjusted to the corresponding reference value.

The present embodiment described above exerts following outstanding effects, for example.

(1) The fuel injection control device (the ECU 60 for engine control) for controlling the injection supply of the fuel to the engine is applied to the injector 20 that has the valve bodies 30a-30d formed with the fuel injection hole 32, the needle 34 accommodated in the valve bodies to open/close the injection hole 32, and the piezoelectric element 52 for driving the needle 34 such that the needle 34 reciprocates and that can continuously adjust the injection rate indicating the fuel injection quantity per unit time in accordance with the injection command signal to the piezoelectric element 52. The fuel injection control device has the program (S21 of FIG. 8) for sensing the fuel pressure waveform indicating the transition of the fuel pressure fluctuation accompanying a predetermined injection of the injector 20 and the program (S42 of FIG. 11) for calculating the injection command signal of the piezoelectric element 52 for approximating the total injection quantity of one injection to the corresponding reference value based on the fuel pressure waveform sensed by the above program.

With such the construction, the total injection quantity of the target injection can be approximated to the corresponding reference value easily and appropriately based on the fuel pressure waveform. Among the various injectors, the device according to the present embodiment specifically uses the injector of the reciprocation drive type that can continuously adjust the injection rate. With such the injector 20, the injection characteristic of the injector 20 can be precisely controlled based on the injection command signal to the injector 20. Moreover, such the injector 20 has been already put into practical use in part, and the practicality thereof has been acknowledged. Thus, according to the above-described construction, the appropriate fuel injection control can be performed in accordance with the injection characteristic of each time with high practicality.

(2) During execution of a predetermined injection, the device calculates the correction value of the injection command signal (the injection command to the piezoelectric element 52) concerning the currently executed injection in the processing of FIG. 11. The device has the program (S42 of FIG. 11) for correcting the injection command signal concerning the currently executed predetermined injection with the calculated correction value of the injection command signal during the execution of the predetermined injection. With such the construction, the injection characteristic (equivalent to the pressure transition) concerning the above-described predetermined injection can be sensed with high simultaneity (i.e., in real time). Eventually, the error at the preceding timing can be compensated by adjusting the subsequent injection operation based on the previously sensed pressure transition, for example.

(3) The fuel pressure sensor 20a is provided on the injector 20 side of the connection section 12a (the orifice). Thus, the pressure fluctuation mode can be sensed with the fuel pressure sensor 20a before the fuel pulsation is reduced by the orifice. Eventually, the pressure fluctuation mode can be sensed with high accuracy.

(4) A rail pressure sensor generally attached to the common rail 12 is omitted, so a wide space near the common rail 12 can be ensured. Even if the rail pressure sensor is omitted, the usual fuel injection control can be performed appropriately based on the sensor output of the fuel pressure sensor 20a in the structure having the above-described fuel pressure sensor 20a.

(5) In the processing of FIG. 8, the sensor output of the above-described fuel pressure sensor 20a is sequentially obtained at an interval (20 μsec) short enough to plot the profile of the pressure transition waveform with the sensor output. Thus, the above-described fuel pressure waveform (i.e., the pressure fluctuation mode) can be appropriately sensed with high accuracy.

(6) The fuel pressure sensor 20a is provided to each one of the fuel inlets of the injectors 20 of the cylinders #1-#4. Thus, the mountability and maintenance performance of the fuel pressure sensor 20a are improved and the pressure can be sensed accurately and relatively stably.

Next, a second embodiment of the present invention will be described.

In the second embodiment, concerning the injection rate waveform of the actual injection, various timings other than the injection start timing and the injection rates at the timings are also sensed based on the output of the above-described fuel pressure sensor 20a. The injection rate waveform concerning the injection is sensed based on the sensed timings and the injection rates. In addition, the operation current signal, i.e., the operation signal (the actuator operation signal) to the above-described piezoelectric element 52 (FIG. 2), for approximating the sensed injection rate waveform to the above-mentioned basic waveform (part (c) of FIG. 6) is calculated. However, in the present embodiment, the calculated operation current signal is not set during execution of the predetermined injection executed on the occasion of the calculation. That is, the thus-calculated operation current signal is set as a command concerning a certain injection of the same kind as the predetermined injection if the certain injection is performed after the injection end of the predetermined injection. For example, the certain injection is an injection of an injection pattern (defined in the reference map of S12 of FIG. 5) that is the same as or similar to the injection pattern of the predetermined injection. More specifically, by updating the correction coefficient of S12 of FIG. 5, the injection pattern reflecting the correction coefficient is obtained in S12 when the injection of the same kind is performed again in a subsequent combustion cycle. Thus, the proper injection command can be obtained over a long period of time.

First, with reference to FIGS. 14 to 17, a mode of sensing the various timings other than the injection start timing concerning the above-described injection rate waveform, or more specifically, a mode of sensing a maximum injection rate reaching timing, an injection rate decrease start timing and an injection end timing and the injection rates at the respective timings concerning the injection rate waveform will be explained in detail. Fundamentally, a series of processing shown in the drawings is serially performed at a predetermined interval (e.g., at an interval of 20 μsec) through execution of a program (or programs) stored in the ROM by the ECU 60. A series of processing of FIGS. 8 and 9 mentioned above is serially performed also in the present embodiment to detect the injection start timing in the same mode as the first embodiment. Also in the case of detecting the timing other than the injection start timing, the target timing is detected based on the data P dP, ddP calculated and stored by the processing of FIG. 8.

Figure 14:
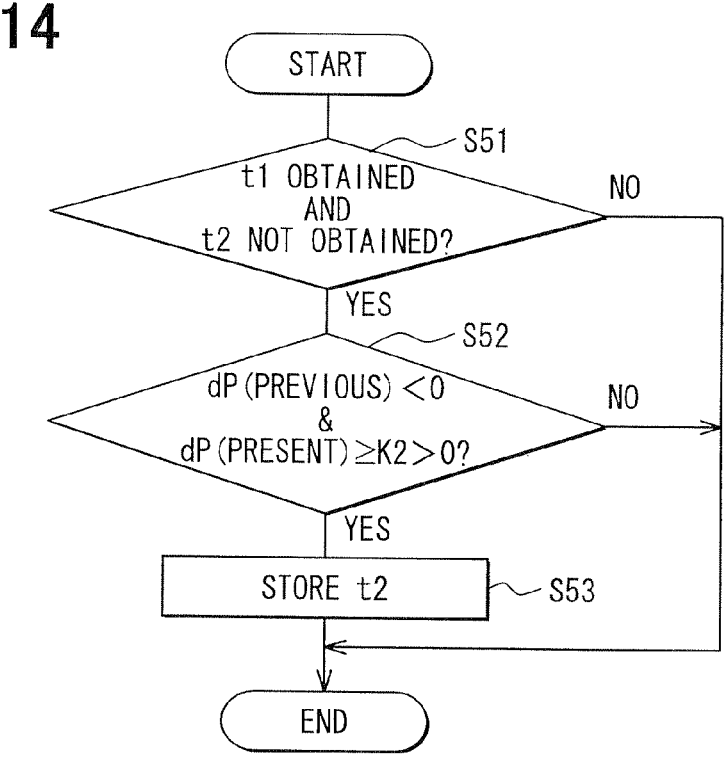
FIG. 14 is a flowchart showing a flow of a maximum injection rate reaching timing detection program according to a second embodiment of the present invention.

FIG. 14 is a flowchart showing a flow of a maximum injection rate reaching timing detection program according to the present embodiment. That is, the program detects the maximum injection rate reaching timing (a timing corresponding to the timing t20 in part (c) of FIG. 6).

In a series of the processing based on the program, first in S51, it is determined whether the injection start timing t1 has been detected and the maximum injection rate reaching timing t2 has not been detected yet concerning the aforementioned injection. Only when it is determined that the injection start timing t1 has been detected and the maximum injection rate reaching timing t2 has not been detected yet in S51 concerning the injection, processing from S52 is performed. That is, a period in which the condition of S51 is satisfied corresponds to a detection period of the above-described maximum injection rate reaching timing t2.

In S52, it is determined whether a previous value of the pressure first order differential value dP calculated in S22 of FIG. 8 is smaller than 0 (dP(previous)<0) and a present value of the pressure first order differential value dP is equal to or greater than a predetermined threshold value K2 (i.e., dP(present)≧K2). The threshold value K2 may be either one of a fixed value and a variable value. The threshold value K2 is set at a value greater than 0, i.e., a positive value (K2>0).

The processing in S52 is repeatedly performed during the detection period of the timing t2. If it is not determined in S52 that dP(previous)<0 and dP(present)≧K2, the series of the processing of FIG. 14 is ended. If it is determined that dP(previous)<0 and dP(present)≧K2, the present timing is stored as the maximum injection rate reaching timing t2 in a predetermined storage device (for example, the EEPROM, the backup RAM or the like) in following S53. Moreover, the fuel pressure and eventually an injection rate IR at the timing t2 are also stored in the same storage device together. A decrease amount of the fuel pressure P from the timing t1 corresponds to the injection rate IR at the timing t2.

Thus, in the present embodiment, the timing when the steep decrease of the fuel pressure P caused at the injection start ends and the fuel pressure P is stabilized, or eventually the maximum injection rate reaching timing t2, is detected as the timing (a cross point) at which the pressure first order differential value dP shifts from the smaller side to the larger side than the threshold value K2. With such the detection scheme, the above-described timing when the fuel pressure stabilizes can be grasped appropriately, and eventually the maximum injection rate reaching timing t2 can be detected with high accuracy.

Figure 15:
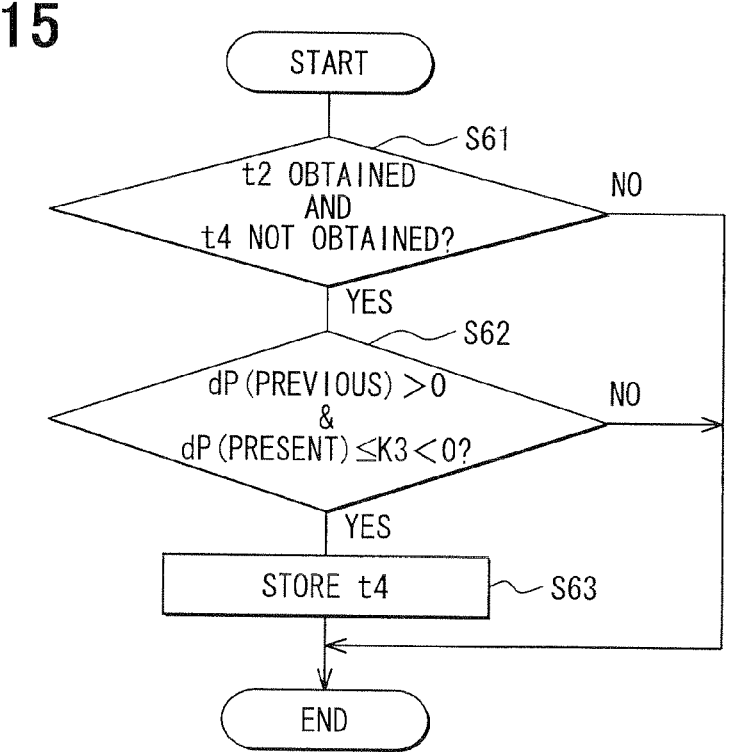
FIG. 15 is a flowchart showing a flow of an injection end timing detection program according to the second embodiment.

FIG. 15 is a flowchart showing a flow of an injection end timing detection program. That is, the program detects the injection end timing (a timing corresponding to the timing t40 in part (c) of FIG. 6).

In a series of the processing based on the program, first in S61, it is determined whether the maximum injection rate reaching timing t2 has been detected and the injection end timing t4 has not been detected yet concerning the aforementioned injection. Only when it is determined that the maximum injection rate reaching timing t2 has been detected and the injection end timing t4 has not been detected yet in S61 concerning the injection, processing from S62 is performed. That is, a period in which the condition of S61 is satisfied corresponds to a detection period of the above-described injection end timing t4.

In S62, it is determined whether a previous value of the pressure first order differential value dP calculated in S22 of FIG. 8 is greater than 0 (dP(previous)>0) and a present value of the pressure first order differential value dP is equal to or smaller than a predetermined threshold value K3 (i.e., dP(present)≦K3). The threshold value K3 may be either one of a fixed value and a variable value. The threshold value K3 is set at a value (<0) smaller than 0, i.e., a negative value.

The processing of S62 is repeatedly performed in the detection period of the injection end timing t4. If it is not determined in S62 that dP(previous)>0 and dP(present)≦K3, the series of the processing of FIG. 15 is ended. If it is determined that dP(previous)>0 and dP(present)≦K3, the present timing is stored as the injection end timing t4 in a predetermined storage device (for example, the EEPROM, the backup RAM or the like) in following S63. Moreover, the fuel pressure P and eventually the injection rate IR at the timing t4 are also stored in the same storage device together.

Thus, in the present embodiment, the timing at which the steep increase of the fuel pressure P accompanying the closing of the injector ends and the pulsation of the fuel pressure P starts, or eventually the injection end timing t4, is detected as the timing (a cross point) at which the pressure first order differential value dP shifts from the larger side to the smaller side than the threshold value K3. With such the detection scheme, the change in the above-described pressure fluctuation mode can be grasped appropriately, and eventually the injection end timing can be detected with high accuracy.

Figures 16, 17A, 17B:
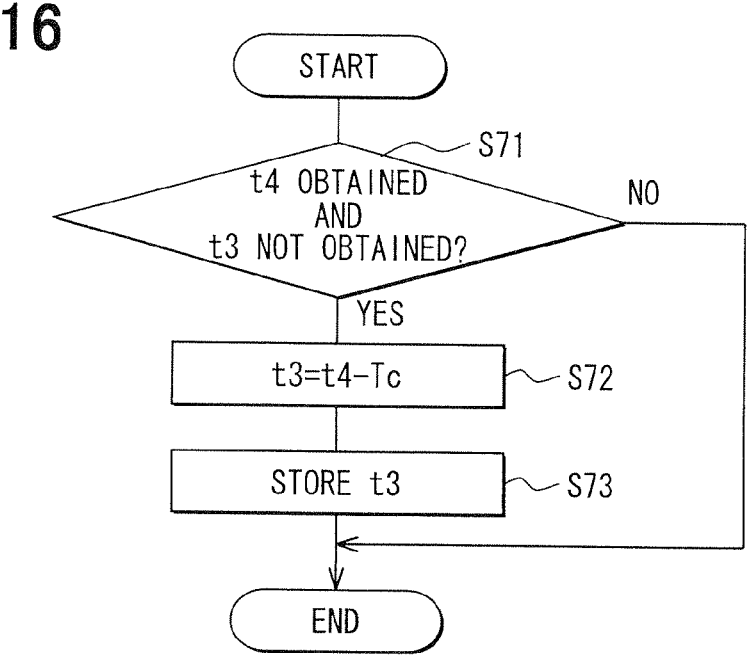
FIG. 16 is a flowchart showing a flow of an injection rate decrease start timing detection program according to the second embodiment.
FIGS. 17A and 17B are maps for variably setting a return time used for detection of the injection rate decrease start timing according to the second embodiment.

FIG. 16 is a flowchart showing a flow of an injection rate decrease start timing detection program. That is, the program detects the injection rate decrease start timing (a timing corresponding to the timing t30 in part (c) of FIG. 6).

In a series of the processing based on the program, first in S71, it is determined whether the injection end timing t4 has been detected and the injection rate decrease start timing t3 has not been detected yet concerning the aforementioned injection. Only when it is determined in S71 that the injection end timing t4 has been detected and the injection rate decrease start timing t3 has not been detected yet concerning the injection, processing from S72 is performed.

In S72, the timing t3 at which the injection rate starts to decrease after reaching the maximum injection rate is detected as a timing earlier than the injection end timing t4 by a predetermined return time Tc (i.e., t3=t4−Tc). In following S73, the injection rate decrease start timing t3 is stored in a predetermined storage device (for example, the EEPROM, the backup RAM or the like). Moreover, the fuel pressure P and eventually the injection rate IR at the timing t3 are also stored in the same storage device together.

The return time Tc is variably set based on multiple maps obtained through experiments and the like beforehand, e.g., maps shown in FIGS. 17A and 17B. This responds to the phenomenon that the period since the injection rate starts to decrease until the injection ends changes in accordance with the fuel pressure P immediately before the injection (i.e., a fuel pressure level at the time when the pressure is stable) and the injection period.

FIG. 17A is a map showing a relationship between the fuel pressure level P (i.e., the actual measurement value measured by the fuel pressure sensor 20a) and an adaptation value (i.e., the optimum value) of the return time Tc obtained through the experiment and the like. As shown in FIG. 17A, according to the map, the return time Tc is set at a shorter time as the fuel pressure level P (i.e., base pressure) increases.

FIG. 17B is a map showing a relationship between the injection period (which is sensed as pulse width TQ of the injection command, for example) and an adaptation value (i.e., the optimum value) of the return time Tc obtained through the experiment and the like. As shown in FIG. 17B, according to the map, the return time Tc is set at a longer time as the injection period lengthens.

Thus, in the present embodiment, the timing at which the injection rate starts decreasing after reaching the above-described maximum injection rate is sensed based on a relative positional relationship with the injection end timing t4 detected through the processing based on the injection end timing detection program (refer to FIG. 15). With such the detection scheme, the injection rate decrease start timing t3 can be detected with high accuracy.

As shown in FIGS. 14 to 17, the device according to the present embodiment has the programs for detecting the injection start timing t1, the maximum injection rate reaching timing t2, the injection rate decrease start timing t3 and the injection end timing t4 in the predetermined injection and the injection rates at the respective timings respectively. Although not shown, the device also has the programs for sensing the related parameters based on the timings and the injection rates. The related parameters include the rising angle θ1a of the first apex P1 (the angle corresponding to the angle θ1 shown in part (c) of FIG. 6), the falling angle θ2a of the fourth apex P4 (the angle corresponding to the angle θ2 shown in part (c) of FIG. 6), and the maximum injection rate (the injection rate corresponding to the height D of the trapezoid shown in part (c) of FIG. 6). The device performs predetermined injection correction concerning the above-described injector 20 based on the above-described various parameters. The above-described maximum injection rate can be calculated as the injection rate at the second apex P2, the injection rate at the third apex P3, an injection rate at an arbitrary timing in the stable interval from the apex P2 to the apex P3, or an injection rate average among the multiple timings in the stable interval.

The injection command correction program according to the present embodiment corrects the operation signal (the operation current signal) of the piezoelectric element 52 in an injection after the predetermined injection based on the deviations of the various parameters from the corresponding reference values (for example, the positions and the angles at the apexes P1 to P4, refer to part (c) of FIG. 6). More specifically, the operation current signal is corrected by updating the correction coefficient of S12 of FIG. 5.

Figure 18:
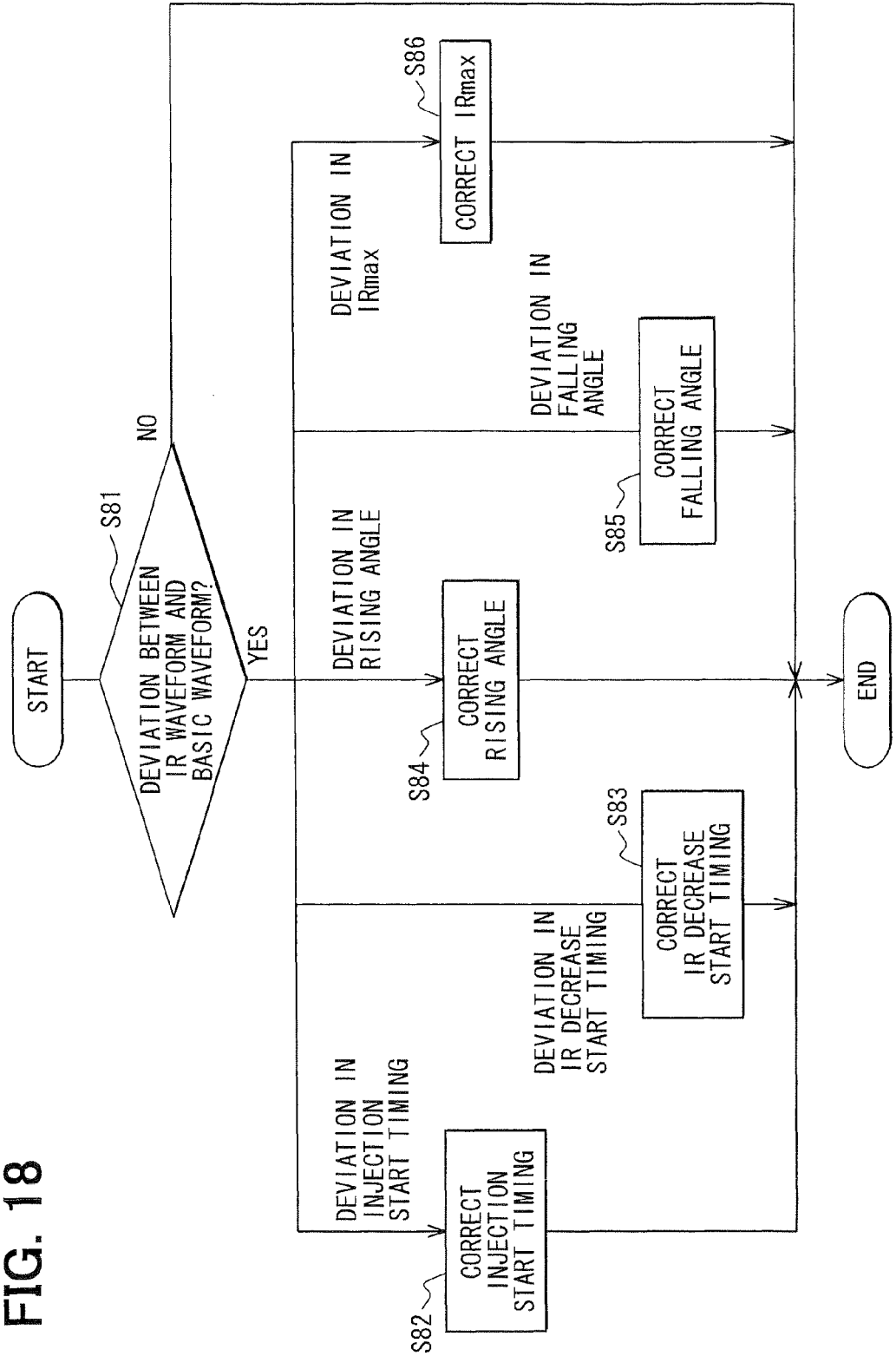
FIG. 18 is a flowchart showing a flow of an injection command correction program according to the second embodiment.

Next, with reference to FIG. 18, processing for correcting the injection command signal (the operation amount of the piezoelectric element 52) to the above-described injector 20 with the injection command correction program based on the deviation of the injection rate waveform from the corresponding basic waveform will be explained. FIG. 18 is a flowchart showing a flow of the injection command correction program according to the present embodiment. This program is executed at a predetermined time interval (for example, at every combustion cycle).

In S81 shown in FIG. 18, it is determined whether the injection rate waveform is deviated from the corresponding reference waveform based on the injection start timing t1, the maximum injection rate reaching timing t2, the injection rate decrease start timing t3 and the injection end timing t4 detected as the result of the above-described timing detection processing.

Figure 19:
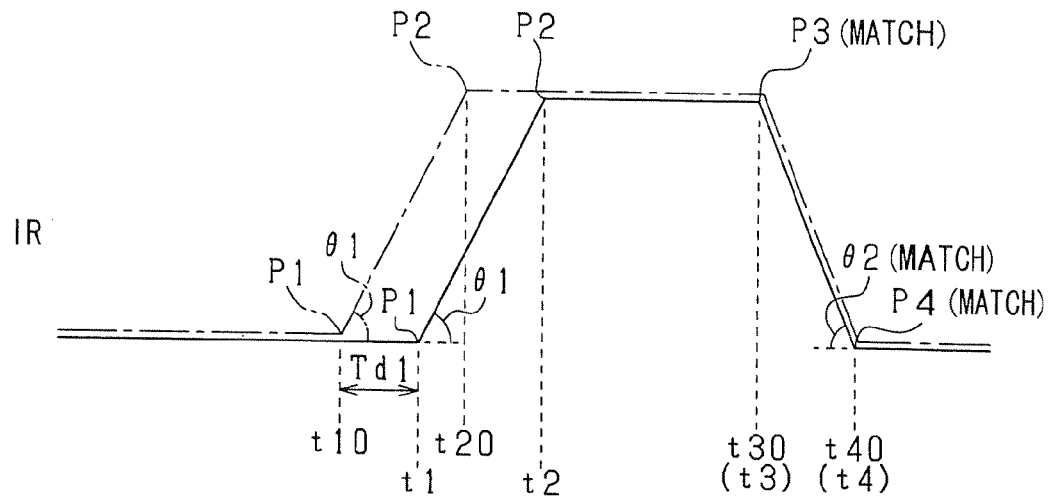
FIG. 19 is a timing chart showing a relationship between an injection rate waveform and a basic waveform in the case where a deviation arises in an injection start timing according to the second embodiment.

For example, as for the deviation of the injection start timing t1, it is determined in S81 whether the third apex P3 and the fourth apex P4 respectively coincide with corresponding apexes of the reference waveform and that the first apex P1 and the second apex P2 are deviated from corresponding apexes of the reference waveform in parallel to a time axis by a permissible level or more (refer to FIG. 6 for each apex). That is, when the injection is performed based on the basic waveform shown in part (c) of FIG. 6, in some cases, as shown in FIG. 19, there occurs a deviation in the injection start timing (i.e., a deviation between the timing t10 and the timing t1) while the rising angle of the first apex P1 is the same between the injection rate waveform (shown by a solid line) and the corresponding basic waveform (shown by a chained line). Therefore, in S81, the existence/nonexistence of such the timing deviation is detected. When it is determined in S81 that such the timing deviation exists, the command signal is corrected in S82 such that the charge pulse operation current signal (part (b) of FIG. 6) moves in parallel to the time axis in accordance with the deviation Td1 of the injection start timing. Thus, the charge period of the piezoelectric element 52 is shifted in parallel to the time axis and the injection start timing is corrected.

Figure 20:
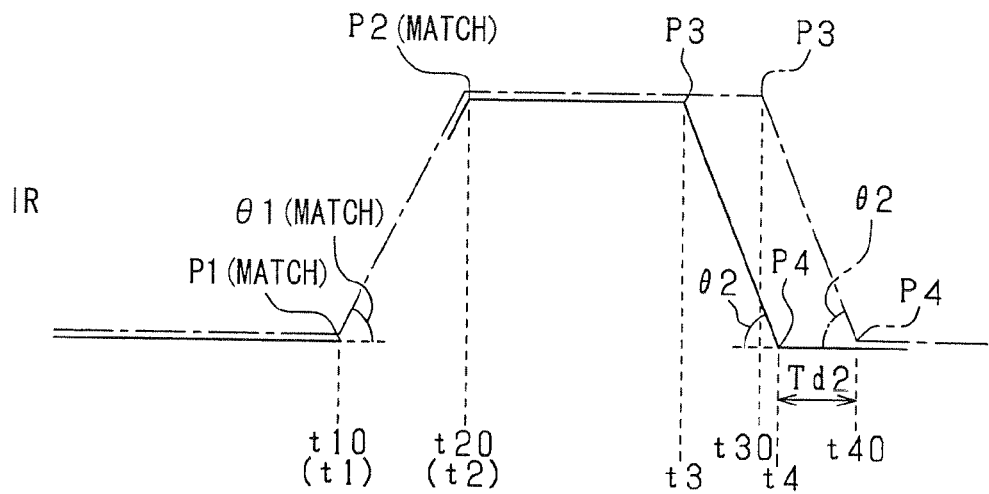
FIG. 20 is a timing chart showing a relationship between the injection rate waveform and the basic waveform in the case where a deviation arises in an injection end timing according to the second embodiment.

As for the deviation of the injection end timing t4, it is determined in S81 whether the first apex P1 and the second apex P2 respectively coincide with the corresponding apexes of the reference waveform and that the third apex P3 and the fourth apex P4 are deviated from the corresponding apexes of the reference waveform in parallel to the time axis (refer to FIG. 6 for each apex). That is, when the injection is performed based on the basic waveform shown in part (c) of FIG. 6, in some cases, as shown in FIG. 20, there occurs a deviation in the timing at which the injection rate starts decreasing after reaching the maximum injection rate (or in the injection end timing t40, t4) while the falling angle of the fourth apex P4 is the same between the injection rate waveform (shown by a solid line) and the corresponding basic waveform (shown by a chained line). Therefore, in S81, the existence/nonexistence of such the timing deviation is detected. When it is determined in S81 that such the timing deviation exists, the injection command signal is corrected in S83 such that the discharge pulse operation current signal (part (b) of FIG. 6) moves in parallel to the time axis in accordance with the deviation Td2 of the injection rate decrease start timing. Thus, a period for suspending the charge and discharge of the piezoelectric element 52 is shifted (changed) in parallel to the time axis and the injection rate decrease start timing is corrected.

Figure 21:
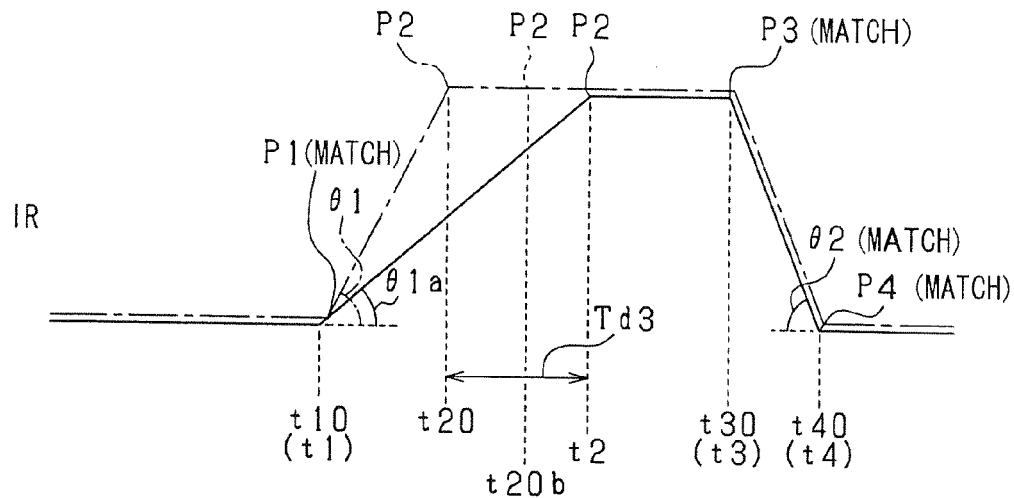
FIG. 21 is a timing chart showing a relationship between the injection rate waveform and the basic waveform in the case where a deviation arises in a rising angle of the injection rate waveform according to the second embodiment.

As for the deviation of the rising angle $\theta 1a$ of the first apex P1, it is determined in S81 whether a deviation of the angle $\theta 1a$ from the corresponding reference value is larger than a permissible level (for example, a predetermined value). That is, when the injection is performed based on the basic waveform shown in part (c) of FIG. 6, in some cases, as shown in FIG. 21, there occurs a deviation in the rising angle of the first apex P1 (a deviation between the angle $\theta 1$ and the angle $\theta 1a$) between the injection rate waveform (shown by a solid line) and the corresponding basic waveform (shown by a chained line). Therefore, in S81, the existence/nonexistence of such the angle deviation is detected. When it is determined in S81 that such the angle deviation exists, the injection command signal is corrected in S84 to increase or decrease the pulse width of the charge pulse operation current signal (part (b) of FIG. 6) in accordance with the deviation in the rising angle of the injection rate waveform. The rising angle of the first apex P1 can be increased by increasing the pulse width of the charge pulse operation current signal. Thus, the rising angle of the injection rate waveform is corrected.

Figure 22:
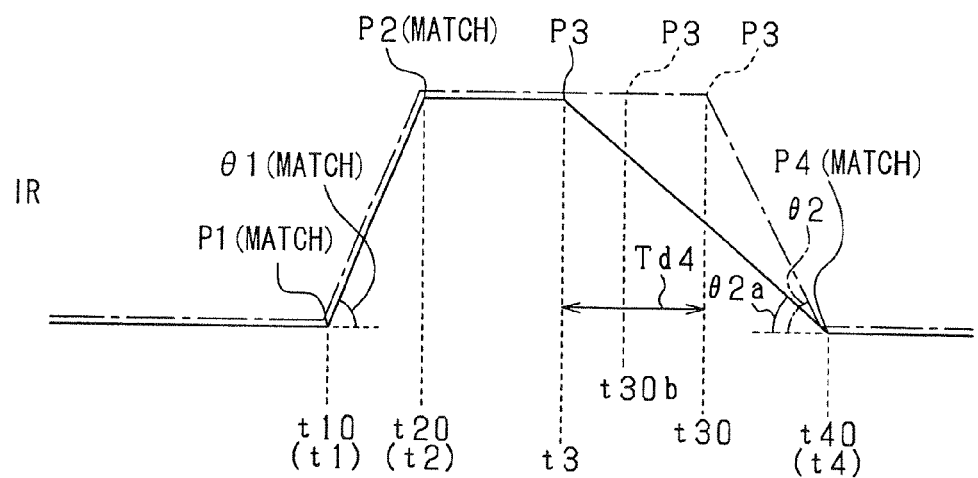
FIG. 22 is a timing chart showing a relationship between the injection rate waveform and the basic waveform in the case where a deviation arises in a falling angle of the injection rate waveform according to the second embodiment.

As for the deviation of the falling angle $\theta 2a$ of the fourth apex P4, it is determined in S81 whether deviation of the angle $\theta 2a$ from the corresponding reference value is larger than a permissible level (for example, a predetermined value). That is, when the injection is performed based on the basic waveform shown in part (c) of FIG. 6, in some cases, as shown in FIG. 22, there occurs a deviation in the falling angle of the fourth apex P4 (a deviation between the angle $\theta 2$ and the angle $\theta 2a$) between the injection rate waveform (shown by a solid line) and the corresponding basic waveform (shown by a chained line). Therefore, in S81, the existence/nonexistence of such the angle deviation is detected. When it is determined in S81 that such the angle deviation exists, the injection command signal is corrected in S85 to increase or decrease the pulse width of the discharge pulse operation current signal (part (b) of FIG. 6). The falling angle of the fourth apex P4 can be increased by increasing the pulse width of the discharge pulse operation current signal. Thus, the falling angle of the injection rate waveform is corrected.

As for the deviation of the maximum injection rate, in S81, it is determined whether the deviation of the maximum injection rate between the injection rate waveform (shown by a solid line) and the corresponding basic waveform (shown by a chained line) is larger than a permissible level (for example, a predetermined value). When it is determined in S81 that such the injection rate deviation exists, the injection command signal is corrected in S86 to increase or decrease the pulse number of the charge pulse operation current signal. Thus, the maximum injection rate is corrected.

As mentioned above, in the present embodiment, the injection command signal to the injector 20 (the operation amount of the piezoelectric element 52) is corrected in order to approximate the injection rate waveform to the corresponding basic waveform.

The present embodiment described above exerts following outstanding effects in addition to the effects (3) to (6) of the first embodiment.

(7) The fuel injection control device (the ECU 60 for engine control) for controlling the fuel injection supply to the engine is applied to the injector 20 that has the valve bodies 30a-30d formed with the fuel injection hole 32, the needle 34 accommodated in the valve bodies to open/close the injection hole 32, and the piezoelectric element 52 for driving the needle 34 such that the needle 34 reciprocates and that can continuously adjust the injection rate indicating the fuel injection quantity per unit time in accordance with the injection command signal to the piezoelectric element 52. The fuel injection control device has the program (S21 of FIG. 8) for sensing the fuel pressure waveform indicating the transition of the fuel pressure fluctuation accompanying a predetermined injection of the injector 20 and the program (S82 to S86 of FIG. 18) for calculating the injection command signal of the piezoelectric element 52 to approximate the injection rate waveform to the corresponding basic waveform based on the fuel pressure waveform sensed by the above program.

With such the construction, the injection rate waveform of the target injection can be approximated to the corresponding basic waveform easily and appropriately based on the fuel pressure waveform. Among the various injectors, the device according to the present embodiment specifically uses the injector of the reciprocation drive type that can continuously adjust the injection rate. With such the injector 20, the injection characteristic of the injector 20 can be precisely controlled based on the injection command signal to the injector 20. Moreover, such the injector 20 has been already put into practical use in part, and the practicality thereof has been acknowledged. Therefore, according to the above-described construction, the appropriate fuel injection control can be performed in accordance with the injection characteristic of each time with high practicality.

(8) In the case where the deviation between the injection rate waveform and the corresponding basic waveform is calculated and a certain injection of the same kind as the predetermined injection is performed after the injection end of the predetermined injection performed on the occasion of the calculation, if there is a deviation in the injection rate waveform (S81 of FIG. 18), the injection command signal concerning the certain injection is corrected in accordance with the deviation (S82 to S86 of FIG. 18). With such the construction, the correction value calculated from the deviation of the injection rate waveform acquired about the predetermined injection is applied to the injection of the same kind performed subsequently, thereby improving the injection characteristic appropriately. Thus, by continuously producing the injection command signal while applying such the feedback to the injection command signal, appropriate fuel injection can be performed over a long period of time.

The above-described embodiments may be modified as follows, for example.

In the first embodiment described above, in order to compensate the error of the total injection quantity of the predetermined injection (equivalent to the area of the injection rate waveform), the injection end timing is corrected based on the deviation of the injection start timing of the same injection. Alternatively, for example, based on the deviation of the injection start timing, a subsequent timing other than the injection start timing such as the maximum injection rate reaching timing or the injection rate decrease start timing (the timing t20 or t30 in part (c) of FIG. 6 (c)) may be corrected. Alternatively, for example, based on the deviation of the timing other than the injection start timing (e.g., the maximum injection rate reaching timing), a predetermined subsequent timing (e.g., the injection rate decrease start timing) may be corrected. In the correction processing on the occasion of the adjustment of the total injection quantity, in place of changing the timing, the injection rate at the timing may be corrected. That is, when the deviation (the error) arises in the predetermined timing concerning the target injection, the total injection quantity can be approximated to the desired value (the reference value) by adjusting the waveform subsequent to the predetermined timing in accordance with the deviation of the predetermined timing.

In the second embodiment, the operation signal of the piezoelectric element 52 is adjusted in order to approximate all of the injection start timing t1, the injection rate decrease start timing t3, the rising angle θ1 of the injection rate waveform, the falling angle θ2 of the injection rate waveform, and the maximum injection rate D to the corresponding reference values. Alternatively, only a part of these parameters may be adjusted.

In the description of the above embodiments, it is assumed that the basic waveform of the injection rate is the trapezoid. Alternatively, an arbitrary diagram may be employed as the basic waveform. However, in order to provide a highly practical construction that reflects characteristics of a general injector, it is effective to adopt one of the triangle, the trapezoid and the rectangle or a diagram as a combination of multiplicity of at least one kind of the three shapes as the basic waveform. As a typical example, a rectangular shape, a triangular shape (a delta shape), a boot shape (equivalent to a combination of two trapezoids) and the like are known in addition to the above-described trapezoidal shape. An example of the boot-shaped basic waveform is shown in FIG. 23.

In the description of the above embodiments, it is assumed that the basic waveform of the injection rate is the trapezoid. Alternatively, a boot-shaped waveform may be set as the basic waveform of the above-described injection rate. An example of the boot-shaped basic waveform is shown in FIG. 23.

Figure 23:
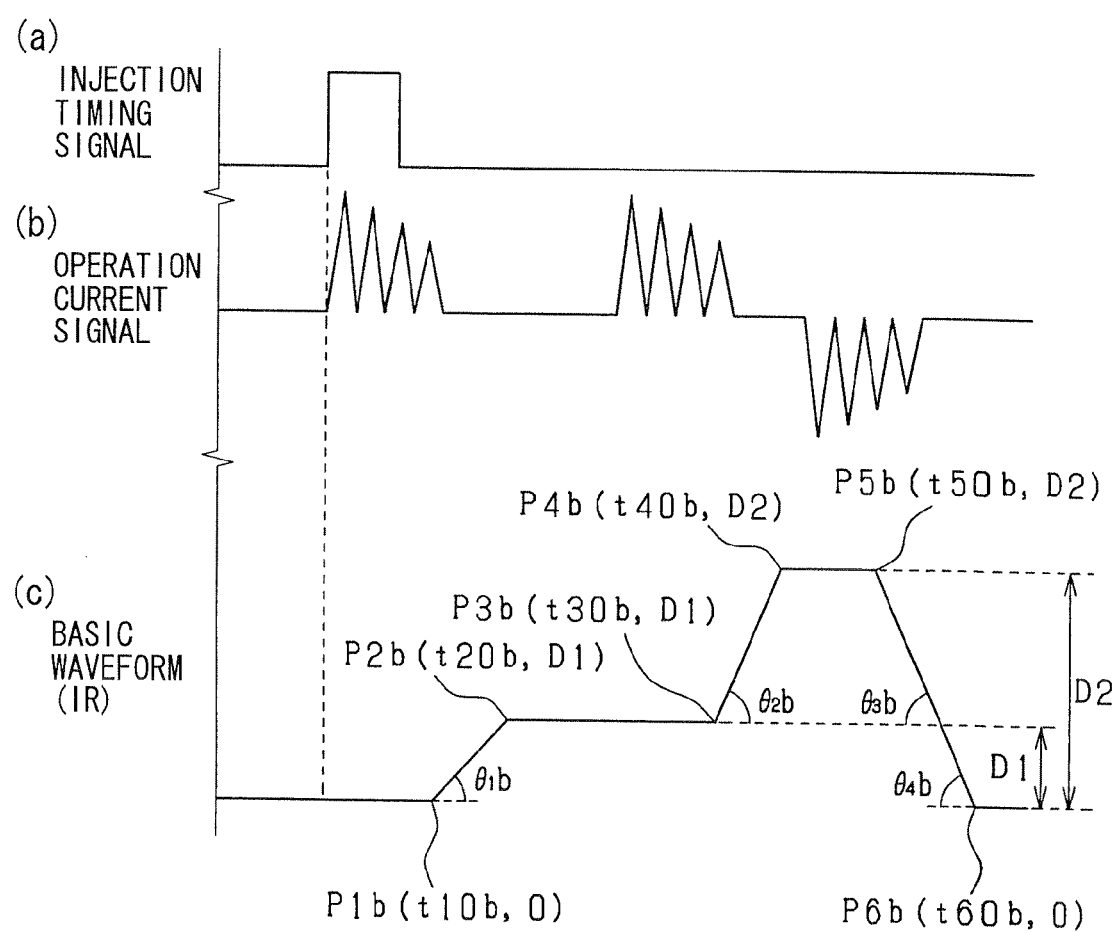
FIG. 23 is a timing chart showing a production mode of an operation current signal according to a modification of the first or second embodiment.

As shown in FIG. 23, the basic waveform of this example is defined by positions of six apexes P1b to P6b, i.e., timings t10b, t20b, t30b, t40b, t50b, t60b, height D1 (a middle injection rate) of a middle stage (a stable interval) of the boot shape, and height D2 of an upper stage (a stable interval) of the boot shape. In this basic waveform, the height D2 corresponds to the maximum injection rate.

Also in this case, like the first embodiment, during the execution of the predetermined injection, the operation signal for approximating a total injection quantity of one injection to a reference value of the same parameter can be calculated and the piezoelectric element 52 (FIG. 2) can be operated with the operation signal. For example, the operation signal (the injection command signal) of the piezoelectric element 52 is variably set in accordance with a deviation of the injection start timing (i.e., a deviation between the reference timing t10 shown in part (c) of FIG. 23b and a sensing value of the same). Thus, in order to compensate the deviation of the injection start timing, an injection end timing can be adjusted by extending or shortening a portion corresponding to a side P2b-P3b or a side P4b-P5b in the injection rate waveform shown in FIG. 23. Eventually, the actual total injection quantity can be approximated to the total injection quantity (equivalent to the area) of the basic waveform.

Also in the case of the boot-shaped basic waveform, like the second embodiment, an injection rate waveform concerning a predetermined injection may be sensed and an operation current signal, i.e., an operation signal (an actuator operation signal) to the above-described piezoelectric element 52 (FIG. 2), for approximating the sensed injection rate waveform to the above-mentioned basic waveform (part (c) of FIG. 23) may be calculated. Then, the operation signal may be set as a command concerning a certain injection of the same kind as the predetermined injection when the certain injection is performed after the end of the predetermined injection. For example, the certain injection is an injection in the injection pattern (defined in the reference map of S12 of FIG. 5) that is the same as or similar to the injection pattern of the predetermined injection.

For example, among an injection start timing (a timing corresponding to the reference timing t10b shown in part (c) of FIG. 23), a middle injection rate reaching timing (a timing corresponding to a reference timing t20b shown in FIG. 23), a timing at which the injection rate starts increasing after reaching the middle injection rate (a timing corresponding to a reference timing t30b in FIG. 23), a maximum injection rate reaching timing (a timing corresponding to a reference timing t40b shown in FIG. 23), an injection rate decrease start timing (a timing corresponding to a reference timing t50b shown in FIG. 23) and injection rates at the respective timings, necessary parameters may be sensed and deviations between the sensing values and corresponding reference values (equivalent to a deviation between the actual injection rate waveform and the basic waveform) may be calculated respectively. Then, in order to compensate the deviations, the operation signal (the injection command signal) of the piezoelectric element 52 in a subsequent injection may be variably set by updating the correction coefficient in S12 of FIG. 5, for example. As a result, the injection rate waveform can be approximated to the basic waveform.

Figure 24:
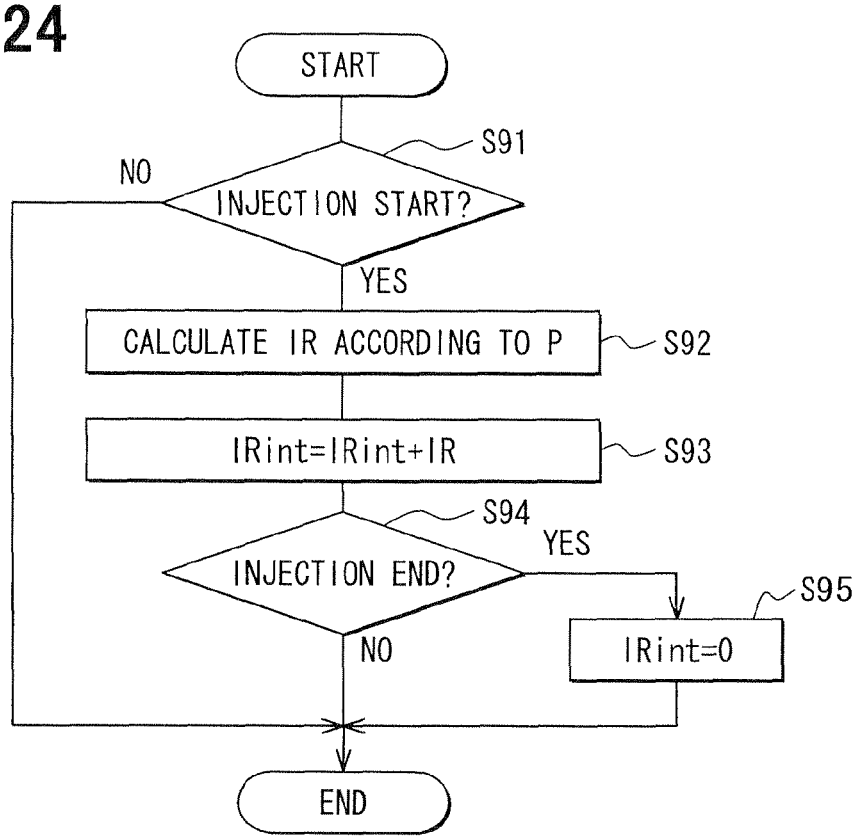
FIG. 24 is a flowchart showing a flow of a program for calculating an integration value of an injection rate according another modification of the first or second embodiment.
Figure 25:
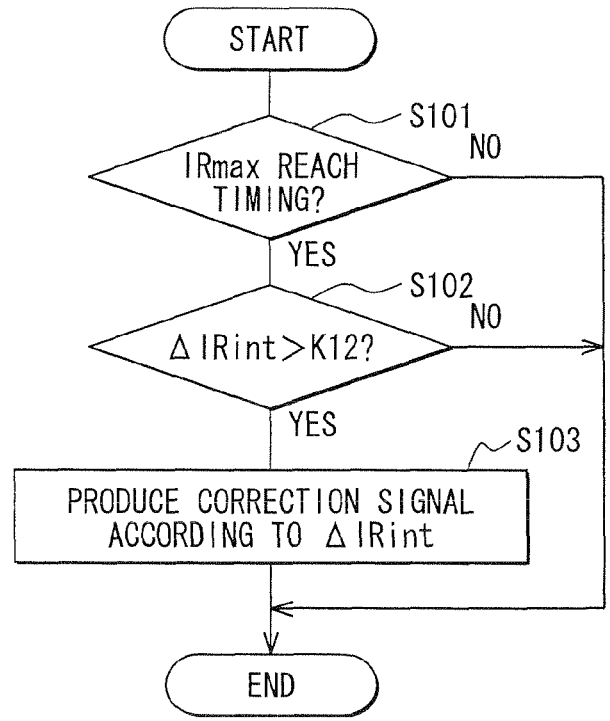
FIG. 25 is a flowchart showing a correction signal production program according to the another modification of the first or second embodiment.

An integration value of an injection rate from an injection start timing t1 to a predetermined timing in a predetermined injection or a correlation value thereof may be calculated. Then, the operation signal (the injection command signal) of the piezoelectric element 52 after the above-described predetermined timing in the same injection may be set based on a deviation of the integration value or the correlation value from a corresponding reference value. An example of such the control is shown in FIGS. 24 and 25. FIG. 24 shows a program for calculating the integration value of the injection rate IR.

FIG. 25 is a flowchart showing a flow of a correction signal production program. These programs are serially executed during a predetermined injection at a predetermined interval (for example, at an interval of 20 μsec). Values of various parameters used in the processing shown in the drawings are sequentially stored in the storage device mounted in the ECU 30 such as the RAM, the EEPROM or the backup RAM and are updated at any time when necessary.

In S91 shown in FIG. 24, it is determined whether the target injection (the predetermined injection) is started. When it is determined in S91 that the injection is started, the process proceeds to processing of S92. When it is determined in S91 that the injection is not started, the execution of the program is ended.

In S92, an injection rate IR at the time is calculated from the fuel pressure at the time (the actual measurement value measured by the fuel pressure sensor 20a). For example, the injection rate IR is calculated by a predetermined calculation formula. Fundamentally, the injection rate IR increases as the fuel pressure drop accompanying the injection increases. In following S93, an integration value IRint of the injection rate IR is calculated by integrating the injection rate IR (IRint (present)=IRint(previous)+IR).

In S94, it is determined whether the target injection is ended. More specifically, for example, the processing of FIG. 15 is serially performed and it is determined whether the injection end timing t4 is detected by the processing. If it is determined in S94 that injection is not ended, the execution of the program is ended as it is. If it is determined that the injection is ended, the integration value IRint is set to zero in S95 (IRint=0) and then the execution of the program is ended.

By repeatedly executing the above-described processing, in the interval from the injection start to the injection end, the integration value IRint indicating the total injection quantity in the interval from the injection start to the present time is serially updated and stored for the target injection. That is, with such the program, the integration value of the injection rate from the injection start timing t1 to a predetermined timing in a predetermined injection can be calculated.

In S101 shown in FIG. 25, it is determined whether the maximum injection rate reaching timing t2 is reached. IRmax in FIG. 25 means the maximum injection rate. If it is determined that the maximum injection rate reaching timing t2 is reached, the process proceeds to processing of S102. If it is determined that the maximum injection rate reaching timing t2 is not reached, the execution of the program is ended.

In S102, it is determined whether a deviation ΔIRint of the integration value IRint calculated by the processing of FIG. 24 from a corresponding reference value is larger than a predetermined threshold value K12. If it is determined that the deviation ΔIRint is larger than the threshold value K12, the process proceeds to processing of S103. If it is determined that the deviation ΔIRint is equal to or less than the threshold value K12, the execution of the program is ended.

In S103, a correction signal (signal for correcting the injection rate waveform) corresponding to the deviation ΔIRint of the integration value is produced. For example, the injection rate decrease start timing or the injection end timing is corrected. Thus, the injection rate IR after the maximum injection rate reaching timing t2 can be adjusted based on the injection quantity in the interval from the injection start timing t1 to the maximum injection rate reaching timing t2 of each injection. Eventually, the integration value IRint and the total injection quantity of one injection can be approximated to desired values.

Here, as an example, the reference is made about the case where the injection rate IR after the maximum injection rate reaching timing t2 is adjusted based on the injection quantity up to the timing t2. However, the determination point of the deviation ΔIRint of the above-described integration value IRint is not limited to the above-described maximum injection rate reaching timing. Instead, an arbitrary timing in the interval from the injection start to the injection end may be used.

Figure 26:
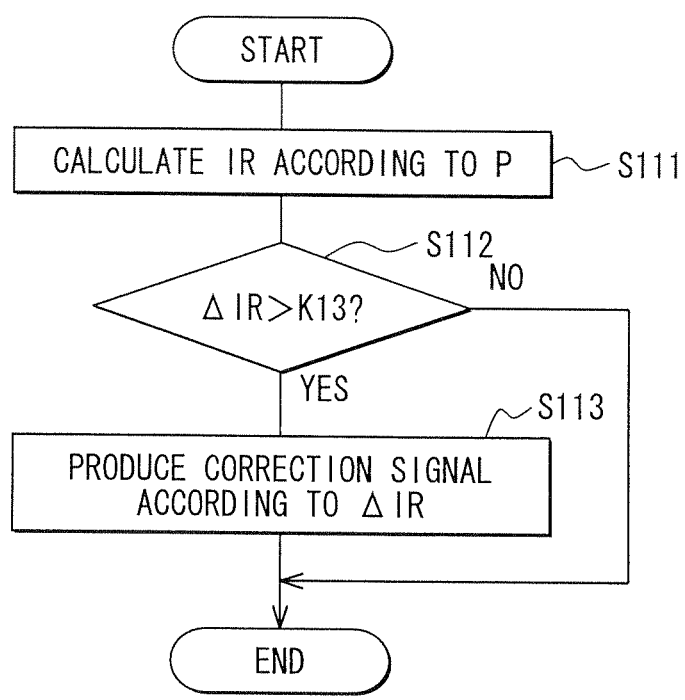
FIG. 26 is a flowchart showing a correction signal production program according to a further modification of the first or second embodiment.

A deviation of an injection rate (e.g., the maximum injection rate) at a predetermined timing in a predetermined injection from a corresponding reference value may be calculated, and the operation signal (the injection command signal) of the piezoelectric element after the predetermined timing in the same injection may be set based on the deviation of the injection rate. FIG. 26 shows an example of such a correction signal production program as a flowchart. The program is serially executed in a predetermined injection at a predetermined interval (for example, 20 μsec). Values of various parameters used in the processing shown in FIG. 26 are serially stored in the storage device mounted in the ECU 60 such as the RAM, the EEPROM or the backup RAM and are updated at any time when necessary.

In S111 shown in FIG. 26, the injection rate IR at the present time is calculated from the fuel pressure at the present time (the actual measurement value measured by the fuel pressure sensor 20a). For example, the injection rate IR is calculated by a predetermined computation formula. Fundamentally, the injection rate IR increases as the fuel pressure drop accompanying the injection increases. In following S112, it is determined whether a deviation ΔIR of the injection rate IR calculated in S111 from a corresponding reference value is larger than a threshold value K13. For example, the reference value is variably set based on the basic waveform. Refer to FIG. 6 or FIG. 23 for the basic waveform. If it is determined that the deviation ΔIR is larger than the threshold value K13, the process proceeds to processing of S113. If it is determined that the deviation ΔIR is equal to or less than the threshold value K13, the execution of the program is ended. In S113, a correction signal corresponding to the deviation ΔIR of the injection rate IR is produced. Thus, the injection rate IR in each injection is fed back to the operation signal of the piezoelectric element 52. With such the construction, the waveform of the injection rate IR can be approximated to a desired waveform.

In each of the above-described embodiments, the adaptation map (used in S12 of FIG. 5) including the adaptation values, which are decided through the experiment or the like beforehand, is adopted. Alternatively, a construction not requiring the adaptation map, i.e., an adaptation-less construction, can be adopted if the corrected values have sufficient reliability.

In each of the above-described embodiments, the fuel pressure sensor 20a (fuel pressure sensor) for sensing the fuel pressure is attached to the fuel inlet of the above-described injector 20. Alternatively, the fuel pressure sensor 20a may be provided inside the injector 20 (for example, near the injection hole 20f shown in FIG. 2). An arbitrary number of the fuel pressure sensor(s) may be used. For example, two or more sensors may be provided to the fuel flow passage of one cylinder. In each of the above-described embodiments, the fuel pressure sensor 20a is provided to each cylinder. Alternatively, the sensor may be provided only in a part of the cylinders (for example, one cylinder), and an estimate based on the sensor output may be used for the other cylinder(s).

In each of the above-described embodiments, the orifice is provided in the connection section 12a to reduce the pressure pulsation in the common rail 12. Alternatively, a flow damper (a fuel pulsation reducing device) may be provided in place of the orifice or together with the orifice to reduce the pressure pulsation in the common rail 12.

In each of the above-described embodiments, the sensor output of the above-described fuel pressure sensor 20a is sequentially acquired at an interval (i.e., in a cycle) of 20 μsec. The acquisition interval may be arbitrarily changed in a range capable of grasping the tendency of the pressure fluctuation mentioned above. However, according to the experiment conducted by the inventors, an interval shorter than 50 μsec is effective.

It is also effective to provide the device with a rail pressure sensor for sensing the pressure in the common rail 12 in addition to the above-described fuel pressure sensor 20a. With such the construction, the pressure in the common rail 12 (the rail pressure) can be also acquired in addition to the pressure measurement value measured by the above-described fuel pressure sensor 20a. As a result, the fuel pressure can be sensed with higher accuracy.

The kind and the system configuration of the engine as the control target can also be arbitrarily modified in accordance with the use and the like.

In each of the above embodiments, the present invention is applied to the diesel engine as an example. Fundamentally, for example, the present invention can be also applied to a spark ignition gasoline engine (specifically, direct-injection engine) or the like in the similar way. For example, a fuel injection system of a direct injection gasoline engine has a delivery pipe that stores fuel (gasoline) in a high-pressure state. In the system, the fuel is pumped from a fuel pump to the delivery pipe, and the high-pressure fuel in the delivery pipe is injected and supplied into an engine combustion chamber through an injector. In this system, the delivery pipe corresponds to the pressure accumulator.

The device and the system according to the present invention can be applied not only to the injector that injects the fuel directly into the cylinder but also to an injector, which injects the fuel to an intake passage or an exhaust passage of the engine, in order to control the fuel injection pressure or the like.

The target injector is not limited to the injector illustrated in FIG. 2 but is arbitrary as long as the injector can continuously adjust the injection rate.

When such the change of the construction is applied to each of the above-described embodiments and the modifications, it is desirable to appropriately change the details of the various kinds of processing (programs) mentioned above into the optimum forms in accordance with actual construction (as design change).

In each of the above embodiments and the modifications, it is assumed that various kinds of software (programs) are used. Alternatively, the similar functions may be realized by hardware such as dedicated circuits.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection control device applied to an injector that has a valve body formed with a fuel injection hole, a valve member accommodated in the valve body for opening and closing the injection hole, and an actuator for driving the valve member such that the valve member reciprocates and that is structured to be able to continuously adjust an injection rate of the injector indicating a fuel injection quantity per unit time in accordance with an actuator operation signal to the actuator, the fuel injection control device comprising:

a fuel pressure sensing section configured to sense a fuel pressure waveform indicating a transition of a fuel pressure fluctuation accompanying a predetermined injection of the injector; and an operation signal calculating section configured to calculate the actuator operation signal for approximating a predetermined injection parameter concerning the predetermined injection to a reference value of the parameter based on the fuel pressure waveform sensed by the fuel pressure sensing section, wherein the operation signal calculating section calculates the actuator operation signal concerning the predetermined injection during execution of the predetermined injection; and an operation signal setting section configured to set the actuator operation signal calculated by the operation signal calculating section as a command concerning the predetermined injection during the execution of the predetermined injection, wherein the operation signal calculating section calculates an integration value of an injection rate from an injection start to a predetermined timing of the predetermined injection, and corrects a waveform signal of the injection rate based on a deviation of the integration value and a reference value thereof to approximate a total injection quantity of one injection as the injection parameter to a reference value of the parameter, wherein the deviation of the integration value and the reference value thereof is determined upon determination that a maximum injection rate reach timing has been reached.

2. The fuel injection control device as in claim 1, wherein the operation signal calculating section further calculates a signal for deciding an injection end timing of the predetermined injection as the actuator operation signal.

3. The fuel injection control device as in claim 1, wherein the command concerns a certain injection of the same kind as the predetermined injection, which is executed on the occasion of the calculation of the actuator operation signal, if the certain injection is executed after an end of the predetermined injection.

4. The fuel injection control device as in claim 3, wherein the operation signal calculating section further calculates a rising angle or a falling angle of an injection rate waveform indicating a transition of the injection rate in the predetermined injection based on the fuel pressure waveform and calculates the actuator operation signal for bringing the rising angle or the falling angle of the injection rate waveform of the injection as the injection parameter close to a reference value of the parameter based on a deviation of the rising angle or the falling angle from a reference angle thereof.

5. The fuel injection control device as in claim 4, wherein the injection rate waveform takes the form of one of a triangle, a trapezoid and a rectangle or the form of a diagram as a combination of multiplicity of at least one kind of the triangle, the trapezoid and the rectangle.

6. The fuel injection control device as in claim 1, wherein the fuel injection control device is applied to a pressure accumulator type fuel injection system having a pressure accumulator for accumulating high-pressure fuel to be supplied to the injector and at least one fuel pressure sensor for sensing pressure of the fuel flowing through an inside of a fuel passage extending from a fuel discharge hole of the pressure accumulator to the injection hole of the injector at a predetermined point downstream of a neighborhood of the fuel discharge hole of the pressure accumulator with respect to a fuel flow direction, and the fuel pressure sensing section senses the fuel pressure waveform by sequentially sensing the fuel pressure based on an output of the fuel pressure sensor.

7. The fuel injection control device as in claim 6, wherein the fuel pressure sensor is provided inside or near the injector.

8. The fuel injection control device as in claim 1, wherein the fuel injection control device is applied to a pressure accumulator type fuel injection system having a pressure accumulator for accumulating high-pressure fuel to be supplied to the injector, a fuel pulsation reducing section provided in a connection between the pressure accumulator and a fuel discharge pipe of the pressure accumulator for reducing a fuel pulsation transmitted to the pressure accumulator through the fuel discharge pipe, and at least one fuel pressure sensor for sensing pressure of the fuel flowing through an inside of a fuel passage extending from the pressure accumulator to the injection hole of the injector at a predetermined point downstream of the fuel pulsation reducing section with respect to a fuel flow direction, and the fuel pressure sensing section senses the fuel pressure waveform by sequentially sensing the fuel pressure based on an output of the fuel pressure sensor.

9. The fuel injection control device as in claim 8, wherein the fuel pulsation reducing section is constituted by an orifice, a flow damper, or a combination of the orifice and the flow damper.

10. The fuel injection control device as in claim 8, wherein the fuel pressure sensor is provided inside or near the injector.

11. The fuel injection control device as in claim 1, wherein the actuator is a piezoelectric element that continuously changes an extension-contraction amount thereof in accordance with a continuous change of the actuator operation signal.

12. The fuel injection control device as in claim 1, wherein the injection rate is calculated based on an actual measurement by a fuel pressure sensor and a predetermined calculation formula.

13. The fuel injection control device as in claim 1, wherein the operation signal calculating section corrects the waveform signal upon determination that the deviation of the integration value and the reference value is larger than a threshold value.

14. The fuel injection control device as in claim 1, wherein the operation signal calculating section corrects the waveform signal by correcting an injection end timing.

* * * * *